(12) United States Patent
Rivers et al.

(10) Patent No.: US 9,977,420 B2
(45) Date of Patent: *May 22, 2018

(54) AUTOMATICALLY GUIDED TOOLS

(71) Applicant: Shaper Tools, Inc., San Franciso, CA (US)

(72) Inventors: Alec Rothmyer Rivers, Oakland, CA (US); Ilan Ellison Moyer, Belmont, MA (US)

(73) Assignee: Shaper Tools, Inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/678,752

(22) Filed: Apr. 3, 2015

(65) Prior Publication Data

US 2015/0277421 A1    Oct. 1, 2015

Related U.S. Application Data

(63) Continuation of application No. 13/477,029, filed on May 21, 2012, now Pat. No. 9,026,242.

(60) Provisional application No. 61/488,118, filed on May 19, 2011, provisional application No. 61/639,062, filed on Apr. 26, 2012.

(51) Int. Cl.
*G06F 19/00* (2011.01)
*G05B 19/19* (2006.01)
*B23Q 9/00* (2006.01)

(52) U.S. Cl.
CPC ........... *G05B 19/19* (2013.01); *B23Q 9/0042* (2013.01); *G05B 2219/36429* (2013.01)

(58) Field of Classification Search
CPC ............ G05B 19/40937; G05B 19/182; G05B 19/402; G05B 19/4097; G05B 2219/35158; G05B 2219/35167; G05B 2219/35168; G05B 2219/35219; G05B 2219/37555;
(Continued)

(56) References Cited

U.S. PATENT DOCUMENTS 4,326,824 A    4/1982  Lasermann et al.
4,552,493 A    11/1985  Schultshick
(Continued)

FOREIGN PATENT DOCUMENTS

DE         3942901        6/1991
DE      202004005478      8/2004
(Continued)

OTHER PUBLICATIONS

Final Office Action for U.S. Appl. No. 13/477,029 dated Sep. 23, 2014.
(Continued)

*Primary Examiner* — Darrin Dunn
(74) *Attorney, Agent, or Firm* — Almanac IP Advisors LLP; Satyadev Rajesh Patel

(57) ABSTRACT

A position correcting system, method and tool for guiding a tool during its use based on its location relative to the material being worked on. Provided is a system and tool which uses its auto correcting technology to precisely rout or cut material. The invention provides a camera which is used to track the visual features of the surface of the material being cut to build a map and locate an image on that map used to reference the location of the tool for auto-correction of the cutting path.

42 Claims, 15 Drawing Sheets

(58) Field of Classification Search
CPC ........... G05B 2219/40623; G05B 2219/50297; G05B 19/37

See application file for complete search history.

(56) References Cited

U.S. PATENT DOCUMENTS

| | | | | |
|---|---|---|---|---|
| 4,789,931 A * | 12/1988 | Kuragano | ........... | G05B 19/4099 318/572 |
| 4,907,169 A * | 3/1990 | Lovoi | .................... | B23K 26/04 219/124.34 |
| 4,912,625 A * | 3/1990 | Glatfelter | ........... | G05B 19/4068 700/184 |
| 4,965,499 A * | 10/1990 | Taft | ...................... | B23Q 35/128 219/124.34 |
| 5,010,652 A | 4/1991 | Miletich | | |
| 5,095,788 A | 3/1992 | Matoni | | |
| 5,139,376 A | 8/1992 | Pumphrey | | |
| 5,172,326 A | 12/1992 | Campbell, Jr. et al. | | |
| 5,243,665 A * | 9/1993 | Maney | ............... | H01L 21/67242 348/128 |
| 5,255,199 A * | 10/1993 | Barkman | ................ | B23Q 17/09 348/94 |
| 5,333,111 A | 7/1994 | Chaiken et al. | | |
| 5,436,027 A | 7/1995 | Offer | | |
| 5,448,146 A | 9/1995 | Erlbacher | | |
| 5,465,215 A | 11/1995 | Stricklan et al. | | |
| 5,467,003 A * | 11/1995 | Kosaka | ................ | B23Q 35/128 318/568.13 |
| 5,575,099 A * | 11/1996 | Strobel | .............. | G05B 19/4097 144/134.1 |
| 5,777,880 A | 7/1998 | Bowen et al. | | |
| 5,780,805 A | 7/1998 | Duncan et al. | | |
| 5,799,135 A * | 8/1998 | Terawaki | ................ | B25J 9/1679 700/258 |
| 5,807,449 A | 9/1998 | Hooker et al. | | |
| 5,831,857 A * | 11/1998 | Clarino | .................. | B26D 5/007 178/18.01 |
| 5,857,812 A | 1/1999 | Stahl | | |
| 5,959,425 A * | 9/1999 | Bieman | ............... | G05B 19/4207 318/568.13 |
| 6,044,308 A | 3/2000 | Huissoon | | |
| 6,073,058 A * | 6/2000 | Cossen | ............... | G05B 19/4093 700/182 |
| 6,075,223 A | 6/2000 | Harrison | | |
| 6,107,768 A | 8/2000 | Ouchi et al. | | |
| 6,161,055 A | 12/2000 | Pryor | | |
| 6,292,715 B1 * | 9/2001 | Rongo | .................... | B25J 9/1664 318/568.1 |
| 6,304,050 B1 | 10/2001 | Skaar et al. | | |
| 6,311,098 B1 | 10/2001 | Higasayama et al. | | |
| 6,330,492 B1 | 12/2001 | Wisniewski | | |
| 6,397,124 B1 * | 5/2002 | Lan | ...................... | G05B 19/409 451/5 |
| 6,456,896 B1 | 9/2002 | Ito et al. | | |
| 6,474,378 B1 * | 11/2002 | Ryan | ........................ | B27C 5/02 144/136.95 |
| 6,594,543 B2 * | 7/2003 | Murozumi | ......... | G05B 19/4069 700/180 |
| 6,606,528 B1 * | 8/2003 | Hagmeier | ........... | G05B 19/4097 345/420 |
| 6,663,469 B2 | 12/2003 | Kimura et al. | | |
| 6,701,816 B2 | 3/2004 | Smith | | |
| 6,718,854 B2 | 4/2004 | Bedi et al. | | |
| 6,763,281 B2 | 7/2004 | Schauer et al. | | |
| 6,829,371 B1 | 12/2004 | Nichani | | |
| 6,889,113 B2 | 5/2005 | Tasker et al. | | |
| 7,149,602 B2 * | 12/2006 | Watanabe | ............... | B25J 9/1684 700/186 |
| 7,181,362 B2 | 2/2007 | Ratti et al. | | |
| 7,403,317 B2 | 7/2008 | Mochizuki | | |
| 7,561,301 B2 | 7/2009 | Osumi et al. | | |
| 7,831,292 B2 * | 11/2010 | Quaid | ..................... | A61B 34/20 345/156 |
| 7,894,689 B2 * | 2/2011 | Liu | ........................... | G06T 7/33 382/284 |
| 7,962,192 B2 * | 6/2011 | Bodduluri | ........ | A61B 17/32053 600/407 |
| 8,000,895 B2 | 8/2011 | Shulman | | |
| 8,190,272 B2 * | 5/2012 | Crothers | ................ | B23Q 17/20 700/15 |
| 8,311,661 B2 | 11/2012 | Krapf et al. | | |
| 8,350,514 B2 | 1/2013 | Otsuki | | |
| 8,423,171 B2 | 4/2013 | Sato et al. | | |
| 8,428,768 B2 * | 4/2013 | Bandini | ........... | G05B 19/40937 700/180 |
| 8,620,473 B2 * | 12/2013 | Diolaiti | ................. | A61B 90/37 700/245 |
| 8,700,369 B2 * | 4/2014 | Yang | ....................... | G06F 17/10 700/173 |
| 8,763,721 B2 | 7/2014 | Koeder et al. | | |
| 8,826,548 B2 * | 9/2014 | Kaiser | ................... | B23D 49/167 144/154.5 |
| 8,970,156 B2 * | 3/2015 | Tezuka | ................... | G05B 19/19 318/400.14 |
| 9,073,134 B2 * | 7/2015 | Koeder | ................. | B23D 59/002 |
| 2001/0000805 A1 * | 5/2001 | Kadono | ............ | G05B 19/4097 700/182 |
| 2001/0016786 A1 | 8/2001 | Takahashi et al. | | |
| 2002/0111709 A1 | 8/2002 | DiStasio et al. | | |
| 2002/0129485 A1 | 9/2002 | Mok | | |
| 2002/0164221 A1 | 11/2002 | Izutsu et al. | | |
| 2002/0164223 A1 | 11/2002 | Ryan et al. | | |
| 2002/0169522 A1 | 11/2002 | Kanno | | |
| 2002/0189120 A1 | 12/2002 | Kaneda | | |
| 2003/0000355 A1 * | 1/2003 | Butler | ................... | B23D 59/002 83/13 |
| 2003/0000988 A1 | 1/2003 | Ruhland et al. | | |
| 2003/0120375 A1 | 6/2003 | Arai et al. | | |
| 2003/0120377 A1 | 6/2003 | Hooke et al. | | |
| 2003/0167104 A2 * | 9/2003 | Erichsen | ................ | B24C 1/045 700/281 |
| 2003/0179226 A1 * | 9/2003 | Kawai | ................ | G05B 19/4068 715/722 |
| 2003/0226438 A1 * | 12/2003 | Adams | .................... | B23D 49/08 83/746 |
| 2004/0115606 A1 | 6/2004 | Davies | | |
| 2004/0123297 A1 | 6/2004 | Flautner et al. | | |
| 2004/0125195 A1 | 7/2004 | Satoh | | |
| 2004/0161877 A1 | 8/2004 | Nepomuceno et al. | | |
| 2004/0172164 A1 | 9/2004 | Habibi | | |
| 2004/0189631 A1 | 9/2004 | Kazi | | |
| 2004/0193321 A1 * | 9/2004 | Anfindsen | ............... | B25J 9/1664 700/257 |
| 2004/0245227 A1 | 12/2004 | Grafton-Reed et al. | | |
| 2004/0254673 A1 * | 12/2004 | Tomelleri | .................... | G05B 19/401 700/176 |
| 2005/0055127 A1 | 3/2005 | Swain et al. | | |
| 2005/0115421 A1 * | 6/2005 | Lyons | .................... | B41J 3/4073 101/42 |
| 2005/0119783 A1 | 6/2005 | Brisson et al. | | |
| 2005/0142525 A1 | 6/2005 | Cotin et al. | | |
| 2005/0168616 A1 | 8/2005 | Rastegar et al. | | |
| 2005/0230130 A1 * | 10/2005 | Strasser | .................... | B25F 5/00 173/2 |
| 2005/0241774 A1 | 11/2005 | Hart et al. | | |
| 2005/0277104 A1 * | 12/2005 | Morimoto | ................ | B26D 5/00 434/365 |
| 2005/0283269 A1 | 12/2005 | Genma et al. | | |
| 2006/0016957 A1 * | 1/2006 | Hofmann | ............... | B28D 1/043 250/201.1 |
| 2006/0206233 A1 * | 9/2006 | Carpenter | ............ | B23Q 35/128 700/159 |
| 2006/0229761 A1 | 10/2006 | Kita et al. | | |
| 2007/0085850 A1 * | 4/2007 | Hong | ...................... | G05B 19/41 345/442 |
| 2007/0157782 A1 * | 7/2007 | Hetcher | ................ | B23D 45/048 83/471.3 |
| 2007/0180962 A1 | 8/2007 | Bretschneider et al. | | |
| 2007/0257195 A1 | 11/2007 | Reibel et al. | | |
| 2007/0267104 A1 | 11/2007 | McGehee et al. | | |

(56) References Cited

U.S. PATENT DOCUMENTS

| | | |
|---|---|---|
| 2007/0273854 A1 | 11/2007 | Nagasaka |
| 2008/0018287 A1 | 1/2008 | Ogawa |
| 2008/0027580 A1 | 1/2008 | Zhang et al. |
| 2008/0060535 A1 | 3/2008 | Edwards et al. |
| 2008/0101682 A1* | 5/2008 | Blanford ............... G01B 11/005 382/141 |
| 2008/0177417 A1 | 7/2008 | Kasuga et al. |
| 2008/0208461 A1* | 8/2008 | Gharsalli ............... G01C 21/32 701/425 |
| 2008/0228303 A1 | 9/2008 | Schmitt |
| 2008/0229589 A1 | 9/2008 | Bone |
| 2008/0252248 A1 | 10/2008 | Lundberg et al. |
| 2008/0252726 A1 | 10/2008 | Chan et al. |
| 2008/0302226 A1* | 12/2008 | Fischer ................. B23D 59/002 83/520 |
| 2009/0060574 A1 | 3/2009 | Shibata et al. |
| 2009/0070077 A1 | 3/2009 | Tian |
| 2009/0071941 A1 | 3/2009 | Knoblauch |
| 2009/0124170 A1 | 5/2009 | Thomas |
| 2009/0154791 A1 | 6/2009 | Yoon |
| 2009/0171184 A1* | 7/2009 | Jenkins ................. G01R 33/286 600/411 |
| 2009/0254211 A1 | 10/2009 | Monnin |
| 2009/0259442 A1* | 10/2009 | Gandikota ............... G06F 17/50 703/1 |
| 2010/0018609 A1* | 1/2010 | Van Der Linde ......... B25F 5/02 144/136.95 |
| 2010/0023157 A1* | 1/2010 | Burgess ............. G05B 19/4093 700/186 |
| 2010/0032178 A1 | 2/2010 | Koeder et al. |
| 2010/0033553 A1 | 2/2010 | Levy |
| 2010/0057257 A1* | 3/2010 | Ichikawa ........... G05B 19/4083 700/264 |
| 2010/0063615 A1 | 3/2010 | Mori et al. |
| 2010/0063616 A1 | 3/2010 | Mori et al. |
| 2010/0063617 A1 | 3/2010 | Mori et al. |
| 2010/0070078 A1 | 3/2010 | Kong et al. |
| 2010/0087949 A1 | 4/2010 | Coleman |
| 2010/0111367 A1 | 5/2010 | Hiraoka |
| 2010/0145499 A1* | 6/2010 | Sato ................... B23Q 11/0003 700/193 |
| 2010/0153058 A1* | 6/2010 | Crothers ................ B23Q 17/20 702/150 |
| 2010/0181014 A1 | 7/2010 | Raymond et al. |
| 2010/0206429 A1 | 8/2010 | Pozgay et al. |
| 2010/0213107 A1* | 8/2010 | Susnjara ................ G06Q 90/00 209/583 |
| 2010/0268363 A1 | 10/2010 | Karim et al. |
| 2010/0332438 A1 | 12/2010 | Toland |
| 2011/0027032 A1 | 2/2011 | Keller |
| 2011/0046773 A1* | 2/2011 | Iwashita ............. G05B 19/4097 700/182 |
| 2011/0102542 A1 | 5/2011 | Chen et al. |
| 2011/0125320 A1* | 5/2011 | Bongardt ................ B25J 9/1664 700/245 |
| 2011/0130761 A1* | 6/2011 | Plaskos ................ A61B 17/155 606/87 |
| 2011/0137450 A1* | 6/2011 | Glasser ................. G06Q 30/02 700/193 |
| 2011/0173819 A1* | 7/2011 | Koeder ................. B23D 59/002 30/376 |
| 2011/0190922 A1* | 8/2011 | Walker .................. B24B 13/06 700/118 |
| 2011/0190936 A1* | 8/2011 | Koeder ................. B23Q 17/2233 700/259 |
| 2011/0211938 A1* | 9/2011 | Eakins .................. B25J 9/1687 414/738 |
| 2011/0213490 A1* | 9/2011 | Liu ........................ G01B 11/03 700/193 |
| 2011/0218668 A1 | 9/2011 | Morfino |
| 2011/0228050 A1 | 9/2011 | Wang |
| 2011/0251727 A1* | 10/2011 | Koeder ................. B23D 49/167 700/279 |
| 2011/0282492 A1* | 11/2011 | Krause ................. B25J 9/1664 700/259 |
| 2011/0311328 A1* | 12/2011 | Barr ..................... B23D 59/001 408/2 |
| 2012/0000080 A1 | 1/2012 | Kaiser |
| 2012/0163673 A1 | 6/2012 | Thompson et al. |
| 2012/0221300 A1 | 8/2012 | Tukora |
| 2012/0230550 A1 | 9/2012 | Kraut |
| 2013/0019735 A1* | 1/2013 | Koeder ................. B23D 59/001 83/697 |
| 2013/0068737 A1 | 3/2013 | Saito |
| 2013/0169208 A1 | 7/2013 | Tezuka |
| 2013/0218322 A1* | 8/2013 | Carli .................. B23Q 17/2414 700/180 |
| 2013/0233447 A1* | 9/2013 | Schnell .................... B27C 5/10 144/136.95 |
| 2013/0337238 A1 | 12/2013 | Costin, Jr. |
| 2014/0005807 A1* | 1/2014 | Busschaert ............ G05B 19/02 700/83 |
| 2014/0025191 A1* | 1/2014 | Wadehn ................ B23K 26/048 700/166 |
| 2014/0081441 A1 | 3/2014 | Regan et al. |
| 2014/0313166 A1 | 10/2014 | Rattray et al. |
| 2015/0094836 A1 | 4/2015 | Rivers |
| 2015/0360305 A1* | 12/2015 | Willgert ................ B23D 59/001 30/272.1 |
| 2016/0046010 A1* | 2/2016 | Busscharet ............ B25F 5/021 700/168 |
| 2016/0291567 A1 | 10/2016 | Rivers |
| 2016/0291568 A1 | 10/2016 | Rivers |
| 2016/0291569 A1 | 10/2016 | Rivers |

FOREIGN PATENT DOCUMENTS

| | | |
|---|---|---|
| DE | 10 2008 041 088 | 2/2010 |
| EP | 0314853 | 5/1989 |
| EP | 0588057 | 3/1994 |
| EP | 1174212 | 1/2002 |
| EP | 2 089 178 | 5/2008 |
| EP | 2 302 476 A2 | 3/2011 |
| GB | 2 462 372 | 2/2010 |
| GB | 2 488 703 | 9/2012 |
| JP | S57-033916 | 2/1982 |
| JP | 60-207742 | 10/1985 |
| JP | H06-183194 | 7/1994 |
| JP | H06-183914 | 7/1994 |
| JP | H06183194 | 7/1994 |
| JP | 08-227035 | 9/1996 |
| JP | H09-503253 | 3/1997 |
| JP | 2003-251464 | 9/2003 |
| JP | 2010-036337 | 2/2010 |
| WO | WO-94/03301 | 2/1994 |
| WO | WO-02/068982 | 9/2002 |
| WO | 2008055738 | 5/2008 |
| WO | WO-2012/159123 | 11/2012 |
| WO | 2013163588 | 10/2013 |
| WO | 2016051342 | 4/2016 |
| WO | 2016183390 | 11/2016 |
| WO | 2018035499 | 2/2018 |

OTHER PUBLICATIONS

International Preliminary Report on Patentability for PCT/US2012/038910 dated Nov. 19, 2013.

International Preliminary Report on Patentability for PCT/US2013/038474 dated Nov. 6, 2014.

International Search Report and Written Opinion for PCT/US2013/038474 dated Aug. 16, 2013.

Non-Final Office Action for U.S. Appl. No. 13/477,029 dated Feb. 25, 2014.

U.S. Notice of Allowance for U.S. Appl. No. 13/477,029 dated Jan. 7, 2015.

International Search Report and Written Opinion for PCT/US2012/038910 dated Nov. 20, 2012.

Office Action for Japanese Appl. Ser. No. 2015-509197 dated Apr. 4, 2017 (9 pages).

(56) References Cited

OTHER PUBLICATIONS

Roach, "Handheld cutting tool makes anyone a master carpenter", MSNBC FutureOfTech, Aug. 10, 2012, Downloaded from https://web.archive.org/web/20120810065905/http:/www.futureoftech.msnbc.msn.com/technology/futureoftech/handheld-cutting-tool-makes-anyone-master-carpenter-928602 on Apr. 21, 2017, pp. 1-2.
Bdring, "Position Correcting Hand Tools", Buildlog.Net Blog, Aug. 9, 2012, Downloaded from http://www.buildlog.net/blog/2012/08/position-correcting-hand-tools/ dated Mar. 14, 2017, pp. 1-3.
Benchoff, "Largest CNC router is controlled by hand", Hackaday, Aug. 9, 2012, Downloaded from http://hackaday.com/2012/08/09/largest-cnc-router-is-controlled-by-hand/#more-82158, pp. 1-16.
Boyle, "MIT's Smart Handheld Woodworking Tool Makes Precise Cuts Automatically", Popular Science, Aug. 9, 2012, Downloaded from http://www.popsci.com/diy/article/2012-08/mits-new-smart-woodworking-tool-makes-routing-more-precise on Mar. 31, 2017, pp. 1-8.
Brandon, "Augmented Reality Router", SolidSmack, Sep. 4, 2012, Downloaded from http://solidsmack.com/fabrication/augmented-reality-router/ on Mar. 14, 2017, pp. 1-7.
Eisenberg, "For the Home Workshop, a GPS for Power Tools", The Hew York Times, Sep. 22, 2012, Downloaded from http://www.nytimes.com/2012/09/23/technology/computer-precision-for-power-tools-novelties.html on Mar. 14, 2017, pp. 1-9.
Esler, "Hand-Held CNC Router Hits Precision Cuts", Woodworking Network, Aug. 14, 2012, Downloaded from http://www.woodworkingnetwork.com/news/woodworking-industry-news/Hand-Held-CNC-Router-Self-Corrects-166100876.html on Mar. 14, 2017, pp. 1-8.
Ferguson, "Robotic power tool keeps your woodcutting on track", New Scientist, Aug. 8, 2012, Downloaded from http://www.newscientist.com/blogs/onepercent/2012/08/robotic-power-tool.html on Mar. 14, 2017, pp. 1-5.
Hu, "A Copernican Revolution in Digital Fabrication: Handheld CNC for 2D Applications", Core77, Sep. 5, 2012, Downloaded from http://www.core77.com/blog/digital_fabrication/a_copernican_revolution_in_digital_fabrication_handheld_cnc_for_2d_23342.asp#more on Mar. 14, 2017, pp. 1-20.
Knight, "New router enhances the precision of woodworking—Handheld device precisely follows a digital plan with minimal guidance from a user.", MIT News, Aug. 8, 2012, Downloaded from http://news.mit.edu/2012/automated-handheld-router-for-woodworking-0808 on Mar. 14, 2017, pp. 1-5.
Mack, "MIT Students Create an Incredibly Accurate Router", The World Is My Workshop, Sep. 20, 2012, Downloaded from http://theworldismyworkshop.com/home/2012/9/20/mit-students-create-an-incredibly-accurate-router.html on Mar. 20, 2017, pp. 1-4.
Massachusetts Institute of Technology (Specific Author Unknown), "Rivers, Moyer & Durand create tool allowing human design with digital precision", EECS, Aug. 8, 2012, Downloaded from http://www.eecs.mit.edu//news-events/media/rivers-moyer-durand-create-tool-allowing-human-design-digital-precision on Mar. 14, 2017, pp. 1-4.
McKenna,"MIT Students and Professor Invent Handheld CNC Router System", Fine Woodworking Magazine, Aug. 9, 2012, Downloaded from http://www.finewoodworking.com/item/57081/mit-students-and-professor-invent-handheld-cnc-router-system on Mar. 14, 2017, pp. 1-8.
REDDIT/THEWORLDISMYWORKSHOP,"A Super Precise Automated Router Made by MIT Students", Reddit, Sep. 20, 2012, Downloaded from http://www.reddit.com/r/woodworking/comments/107p14/a_super_precise_automated_router_made_by_mit/ on Mar. 14, 2017, pp. 1-5.
Rivers et al., "Position-Correcting Tools for 2D Digital Fabrication", ACM Transactions on Graphics, vol. 31, No. 4, Article 88, Publication Date: Jul. 2012,Downloaded from http://www.alecrivers.com/positioncorrectingtools/files/Position-Correcting%20Tools%20for%202D%20Digital%20Fabrication.pdf on Mar. 14, 2017, pp. 1-7.
Rivers, "MIT's Infinite Size CNC Router ", Hacker News, Aug. 10, 2012, Downloaded from http://news.ycombinator.com/item?id=4363119 on Mar. 14, 2017, pp. 1-5.
Specific Author Unknown, "GPS for your power tools", Ponoko, Sep. 27, 2012, Downloaded from http://blog.ponoko.com/2012/09/27/gps-for-your-power-tools/ on Mar. 14, 2017, pp. 1-2.
Warfield, "Students Create Hand-Held CNC Router: You Gotta See This!", CNC Cookbook, Aug. 9, 2012, Downloaded from http://blog.cnccookbook.com/2012/08/09/mit-students-create-hand-held-cnc-router-you-gotta-see-this/ on Mar. 14, 2017, pp. 1-8.
U.S. Office Action for U.S. Appl. No. 14/396,291 dated Jan. 18, 2017 (15 pages).
Extended European Search Report for EPO Appl. Ser. No. 13781455.4 dated Aug. 24, 2016 (7 pages).
U.S. Office Action for U.S. Appl. No. 14/396,291 dated Jul. 26, 2017 (17 pages).
U.S. Office Action for U.S. Appl. No. 15/178,380 dated Oct. 12, 2017.
U.S. Office Action for U.S. Appl. No. 15/178,388 dated Nov. 1, 2017.
Snavely, Noah, et al., "Photo Tourism: Exploring Photo Collections in 3D," Proceeding SIGGRAPH '06 ACM SIGGRAPH 2006 Papers, Jul. 2006, pp. 835-46, vol. 25 Issue 3, Association for Computing Machinery, Inc., New York, NY, USA.
Havlena, Michal, et al., "Randomized structure from motion based on atomic 3D models from camera triplets," IEEE Conference on Computer Vision and Pattern Recognition, 2009, Jun. 20-25, 2009, pp. 2874-2881, IEEE.
U.S. Office Action for U.S. Appl. No. 14/396,291 dated Feb. 20, 2018.
U.S. Office Action for U.S. Appl. No. 15/178,376 dated Feb. 22, 2018.
International Search Report for PCT/US2016/032224 dated Aug. 16, 2016.
Written Opinion for PCT/US2016/032224 dated Aug. 16, 2013.
International Search Report for PCT/US2017/047682 dated Feb. 9, 2018.
Written Opinion for PCT/US2017/047682 dated Feb. 9, 2018.
International Preliminary Report on Patentability for PCT/US2016/032224 dated Nov. 14, 2017.
Office Action for Japanese Appl. Ser. No. 2015-509197 dated Sep. 5, 2017 (6 pages).
Preliminary Amendment filed in U.S. Appl. No. 15/178,376 dated Jan. 2, 2018.
Preliminary Amendment filed in U.S. Appl. No. 15/178,376 dated Jan. 18, 2018.
Response to Office Action filed in U.S. Appl. No. 15/178,380 dated Jan. 12, 2018.
Response to Office Action filed in U.S. Appl. No. 15/178,388 dated Jan. 31, 2018.
Response to Office Action filed in U.S. Appl. No. 14/396,291 dated Sep. 25, 2017.

* cited by examiner

AUTOMATICALLY GUIDED TOOLS

REFERENCE TO PRIORITY APPLICATIONS

The present application claims the benefit of priority under 35 U.S.C. § 120 as a continuation of U.S. patent application Ser. No. 13/477,029, filed May 21, 2012, which claims the benefit of priority under 35 U.S.C. § 119 to U.S. Provisional Patent Application No. 61/488,118 filed on May 19, 2011, entitled "Automatically Guided Tools" and U.S. Provisional Patent Application No. 61/639,062 filed on Apr. 26, 2012, entitled "Automatically Guided Tools", the entirety of which are hereby incorporated by reference herein.

BACKGROUND OF THE INVENTION

1. Field of the Invention

The present invention relates generally to tools and methods for working on a surface such as woodworking or printing. More particularly, the present invention relates to ways to determine the exact location of a tool in reference to the surface of a material and using the location to auto-correct the tool along a predetermined path such as a cutting path.

2. Description of the Related Art

Current methods and tools that exist to help guide a tool, such as a hand tool, accurately today are premised on minimizing the movement of the tool in one or more directions. Tools that are more difficult to move accurately are guided through the use of mechanical guides such as railings or fences which can be put in place to assist the user in guiding the tool. These fences or guides limit movement since the tool is restricted by the guide. However, existing guide approaches are unsatisfactory, because they take a significant amount of time to set up and because guides do not support complex paths.

If the tool can be accurately positioned freehand, measuring devices may be used to draw visual guides onto the material being used which can then be manually followed. However, such visual guides are still difficult for the user to follow accurately leading to extensive user error in the cutting plan.

Computer numerical control ("CNC") machines or tools alleviate many of these problems by guiding a tool using a computer which has knowledge of the tool's position relative to its set up within the CNC machine and the plan to be followed. CNC machines control movement of the tool to follow the intended path. However, CNC machines are typically expensive, large, and difficult to set up, and most are limited to working with materials that fit within the CNC machine's physical housing.

SUMMARY OF THE INVENTION

An object of the present invention is to provide a system and method for guiding a tool with the precision and flexibility of CNC tools but without the need for CNC's large and expensive hardware. The present invention introduces the idea of a rig or frame with stage which can be positioned on the surface of a piece of material. The present invention can then automatically determine its position on that material and through movement of the stage can accurately move the stage to any coordinate on the material. In some embodiments of the present invention, a digital camera attached to the rig or frame is used to detect the position of the rig and stage. The digital camera can be used to build a map of a piece of material and track the location of the rig and stage on the map. The present invention may include a tool mounted on the stage that can performs work on the surface of the material such as cutting, drilling, sanding, printing or other tasks.

The present invention also provides for controlling the location of the stage, and any attached tool, relative to the material and a design or plan to adjust the stage and tool based on the sensed position. Thus, a user can free hand a design and the present invention will automatically adjust the stage and associated tool to precisely match the design plan and eliminate or minimize human error. The present invention is particularly useful for controlling a router which can be used to cut wood or other materials.

The present invention may make use of computer vision ("CV") technology which allows input from a digital camera to be processed and understood by a computer. The CV technology provides benefits to the present invention in that it provides the ability to determine the location of the rig relative to the material in a fast and accurate manner while being economical from a hardware standpoint. The present invention may make use of one or more CV or sensor based techniques.

The present invention provides a tool for automatically adjusting the location of a working member of the tool comprising: a stage adapted to receive the working member; at least one motor adapted to move the stage; at least one motor controller that controls the at least one motor, a processor in combination with one or more software applications for processing data and providing information to the at least one motor controller; at least one camera adapted for use with the processor for capturing images of a surface, wherein the captured images are processed to build a map of the surface; wherein a subsequent captured image of the surface is processed to determine the location and orientation of the tool relative to the map; and wherein the processor provides information to control the at least one motor to move the stage and working member to a desired location. The location of the working member or the location of the tool are calculated based upon the location at least one of the at least one cameras. The tool may be one of: a router; a drill; a nail gun; a jigsaw, a scroll saw; or a printer. The working member may be one of: a cutting bit; a saw blade, a drill bit, a hammer, or a printer head. The tool may also provide a display screen indicating the location of the working member relative to at least a portion of the map. A design can be loaded into a memory adapted for use with the processor and displayed on the display relative to the map and location of the working member. The design can be processed to determine an intended path for the working member based on the design and the map. The motor controller can, based on information received from the processor, moves the working member to a point on the intended path.

The present invention also provide a tool for automatically adjusting the location of a working member of the tool comprising: a stage adapted to receive the working member, at least one motor adapted to move the stage; at least one motor controller that controls the at least one motor, a processor in combination with one or more software applications for processing data and providing information to the at least one motor controller; at least one sensor adapted for use with the processor for capturing information about a working piece, wherein the captured information is processed to build a map of the working piece; wherein further sensor information is processed to determine the location and orientation of the tool relative to the map; and wherein the processor provides control information to control the at least one motor to move the stage and working member to a desired location. The location of the working member may be determined based upon the location at least one of the at least one sensors. The location of the tool may be determined based upon the location at least one of the at least one sensors. One of the sensors may be a camera.

Further, the present invention provides a rig for automatically adjusting the location of a working member comprising: a stage adapted to receive the working member of a tool; at least one motor adapted to move the stage; at least one motor controller that controls the at least one motor; a processor in combination with one or more software applications for processing data and providing information to the at least one motor controller; at least one sensor adapted for use with the processor for capturing information about a working piece, wherein the captured information is processed to build a map of the working piece; wherein further sensor information is processed to determine the location and orientation of the working member relative to the map; and wherein the processor provides control information to control the at least one motor to move the stage and working member to a desired location. The location of the working member may be determined based upon the location at least one of the at least one sensors. The location of the tool may be determined based upon the location at least one of the at least one sensors. Further, the location of the rig may be based on the location of at least one of the at least one sensors. One of the sensors may be a camera. The tool which mates with the stage may be one of: a router, a drill; a nail gun; a jigsaw, a scroll saw; or a printer. The working member in the rig may be one of: a cutting bit; a saw blade, a drill bit, a hammer, or a printer head. The rig may further comprise a display screen indicating the location of the working member relative to at least a portion of the map. A design can be loaded into a memory adapted for use with the processor and displayed on the display relative to the map and location of the working member. The design can be loaded into a memory adapted for use with the processor, wherein an intended path for the working member is determined based on the design and the map. The motor control information can move the working member to a point on the intended path.

The rig of the present invention can also perform the method of: selecting and registering a design to be rendered; preparing and aligning a position of the tool on the rig; advancing the tool in a first direction and within a selected range substantially adjacent to an outline of the design; and automatically realigning the tool to a boundary edge of the design in a second direction as the tool is advanced in the first direction.

Further, the present invention provides a method of locating a tool on a material, the tool being attached to a stage on a rig, comprising the steps of: selecting and registering a design to be rendered; preparing and aligning a position of the tool; advancing the tool in a first direction and within a selected range substantially adjacent to an outline of the design; and automatically realigning the tool to a boundary edge of the design in a second direction as the tool is advanced in the first direction. Further steps include the aligning of a position of the tool is performed by comparing the position of at least one marker disposed on the material to the registered position of the design. Additionally, the selected range substantially adjacent to an outline of the design can be a target range window displaying an illustration of: the tool, an intended cut path and a desired tool movement path that may be different from the intended cut path.

Further, the present invention may automatically realign the tool to a boundary edge of the design in a second direction by a repositioning mechanism, as the tool is advanced in the first direction. The methods of the present invention may automatically realign in response to receiving image data from a camera or in response to the processing of a received capture of an image of a marker on the material.

The present invention also provides a method of cutting a design in a material based on a relative constant speed of movement of a tool, the tool being attached to a stage on a rig, comprising: displaying a target range window rendering an illustration of a point of reference of the tool, an intended cut path and a desired tool movement path that may be different from the intended cut path; aligning and advancing the tool in a first direction at the relative constant speed of movement along the desired tool movement path to cut away the material at the intended cut path; and automatically realigning the tool in a second direction to a boundary edge location of the intended cut path as the tool is advanced at the relative constant speed of movement in the first direction along the design. The target range window may include a target range area that surrounds the point of reference of the tool, a portion of the intended cut path and a portion of the desired tool movement path. The desired tool movement path is in at least one of a clockwise or counterclockwise continuous movement around a perimeter of the design. The design may be a virtual overlay in the target range window. The system may automatically realign a position of the tool based on a comparison of a previous position on the design and a preferred next position on the design. Further, an automatic realigning of the tool to a boundary edge of the design in a second direction may be performed automatically by a repositioning mechanism, as the tool is advanced in the first direction. Further, the automatic repositioning of the tool accounts for the width of a cutting member of the tool relative to the intended cut path. Automatic realigning of the tool may be in response to receiving live feed of image data from a camera.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Figure 1:
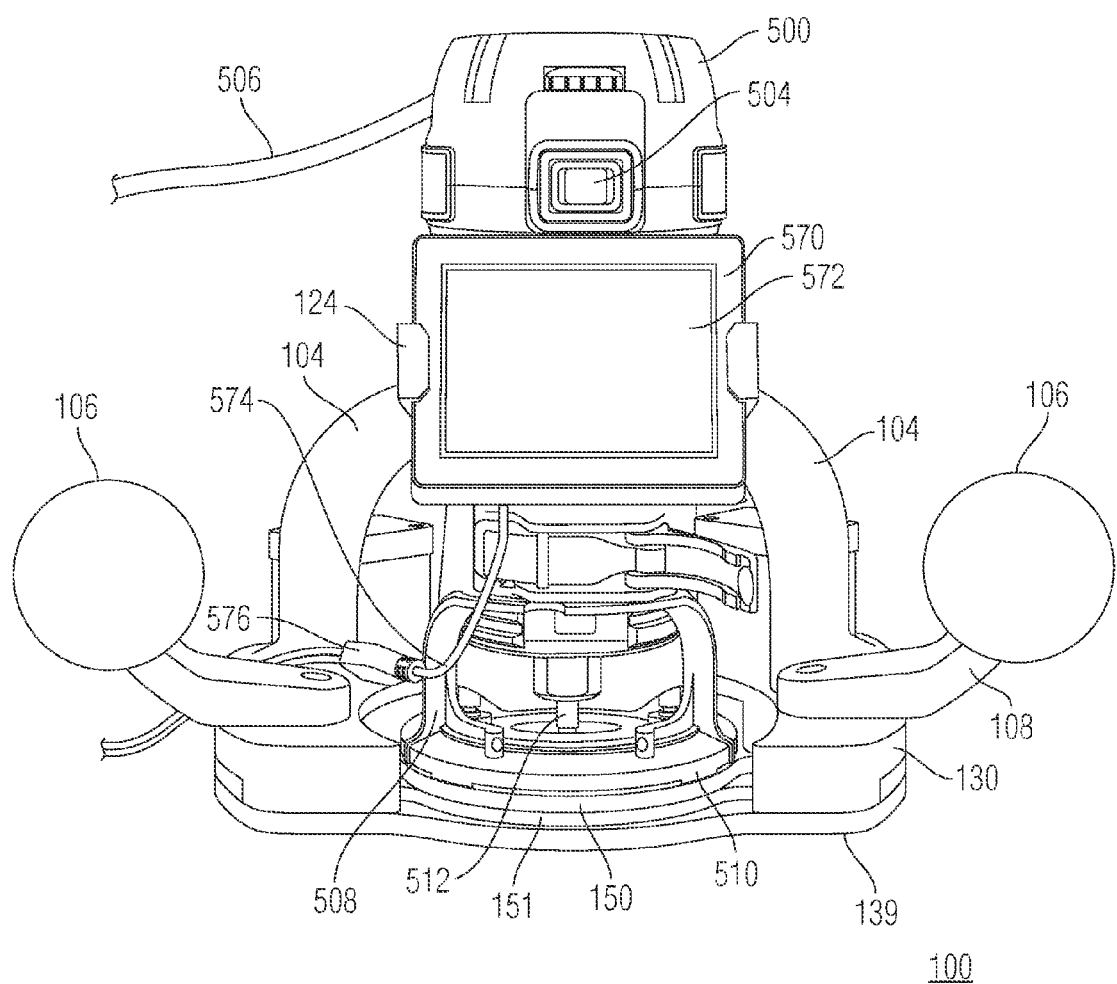
FIG. 1 depicts a front view of an exemplary embodiment of the present invention with a router attached.
Figure 2:
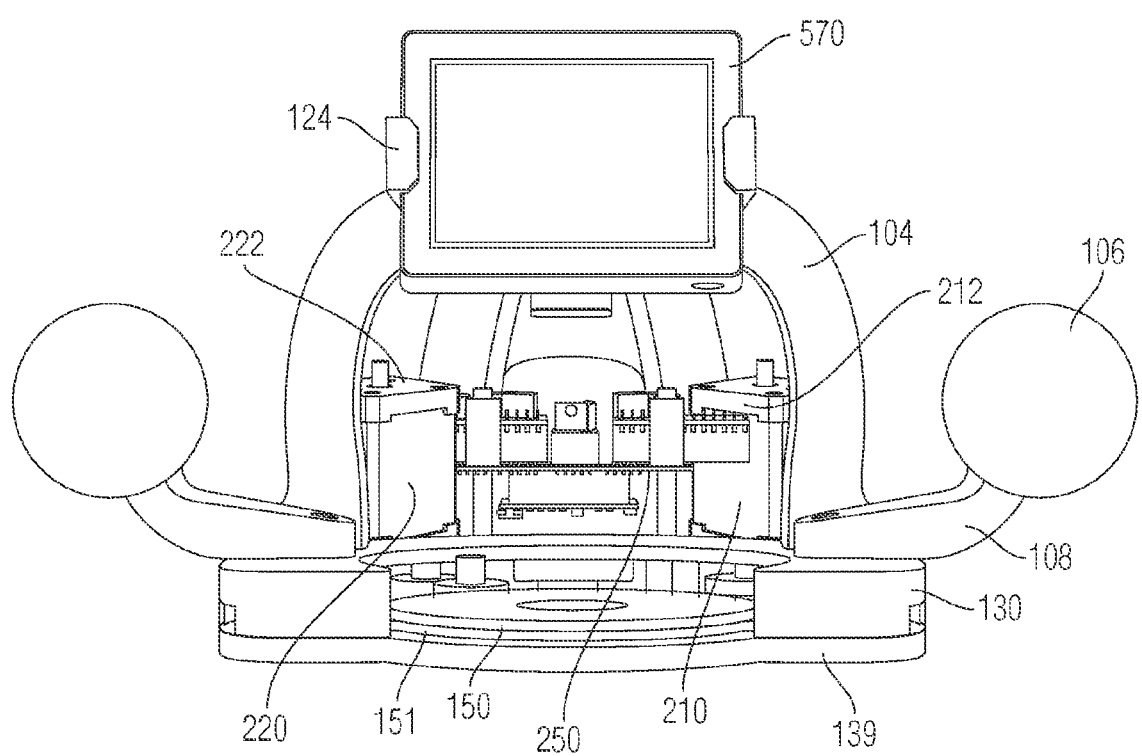
FIG. 2 provides a front view of an exemplary embodiment of the present invention without a tool attached.

Particular embodiments of the present invention will now be described in greater detail with reference to the figures. Like reference numerals apply to similar parts throughout the several views.

This invention overcomes the conventional problems described above by providing a handheld system which can identify the location of a tool, or the rig which contains a tool, relative to the material being worked on and can adjust the tool to the desired location. Therefore, the system can provide a handheld device with a working instrument capable of being operated by hand which can make precision adjustments of the working instrument location based on spatial location to provide an accurate path which the working instrument travels.

Figure 12:
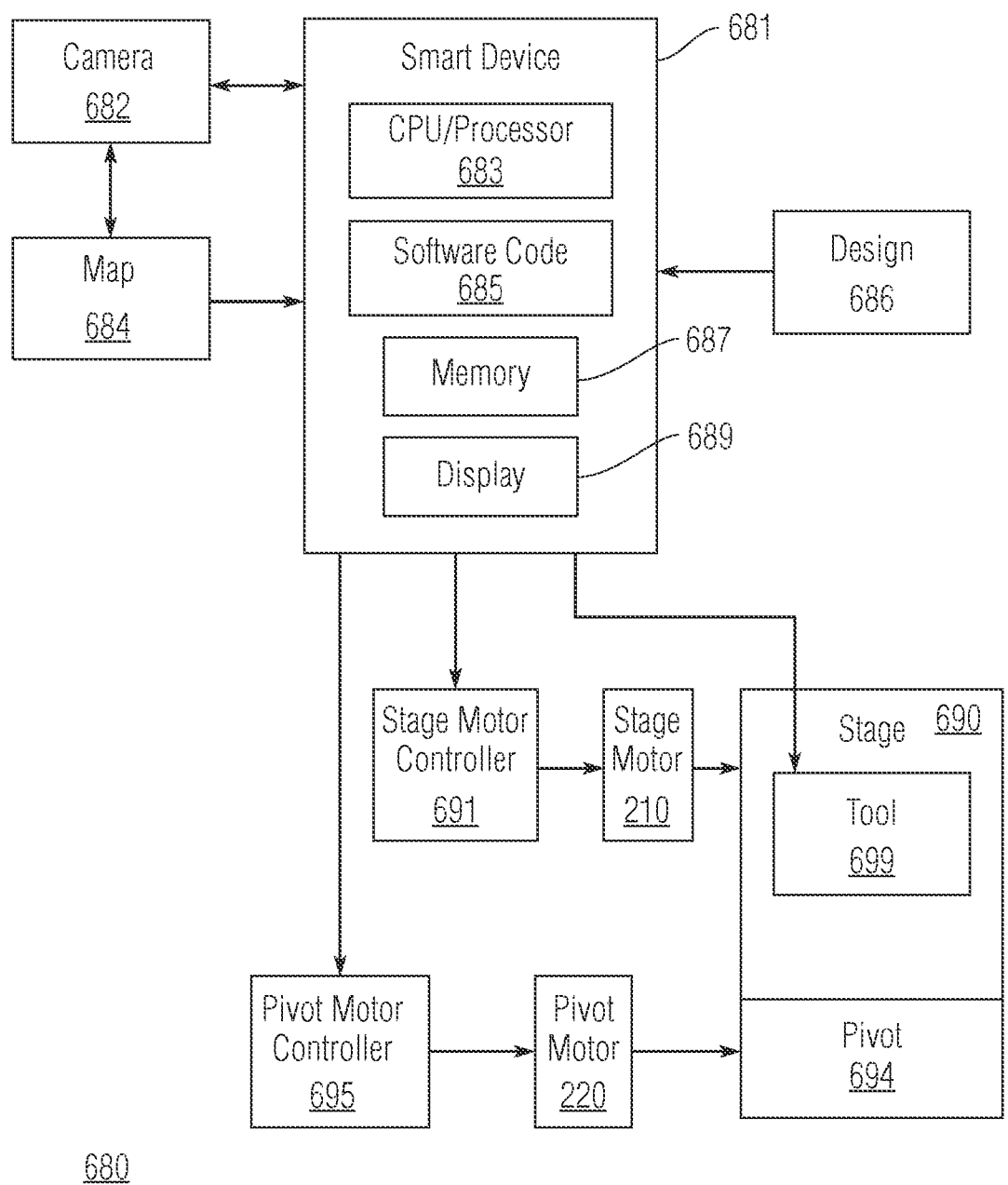
FIG. 12 provides a system element diagram of the present invention.

A diagram of the main system components is best depicted and described in conjunction with FIG. 12. As seen in FIG. 12, a system 680 is provided with a smart device 681. The smart device 681 provides a central processing unit ("CPU") or processor 683, software code 685 which performs one or more processes, memory 687, and a display 689.

The smart device 681 may be one a self-contained unit or may have one or more components separated. For example, the display 689 may be tethered to the smart device 681 or integrated into the housing of the smart device 681. Likewise, the smart device 681 may be integrated as part of the system 680 so that the system is a self contained portable unit. The system 680 also includes a camera 682 which is used in combination with the smart device 681 to build a map 684 of the material to be worked on. The map 684 may be built in various ways including using computer vision ("CV") and sensors. One CV technique that could be employed is using or building a photo mosaic. A photo mosaic process including taking multiple photographs of different parts of the same object and stitching them together to make one overall image covering the entire object.

Another technique which may be employed is simultaneous localization and mapping ("SLAM"). SLAM makes use of a sensor that in combination with a processor 683 and related software 685 is able to build a map 684 of the material being worked on while simultaneously determining the location of the tool 699 relative to the map 684.

Specifically, after the map is built the camera 682 continues to capture images of the material being worked on which are fed to and processed by the smart device 681 to constantly determine the location of the tool 699 or rig. The captured images are analyzed against the map 684 to determine the geo location of the camera 681 relative to the material. Once the location of the camera 682 is determined, the location of the rig is then a known offset from the camera 682 position as the camera 682 is rigidly attached to the rig. The location of the tool 699 relative to the rig is then computed from the current orientations of the motor shafts. The orientations of the motor shafts are known by "homing" them once and then tracking all steps taken since the homing process. Alternatively, encoders could be used instead of homing as the encoders would be able to tell the orientations of the shafts directly. Through the offsets and calculations, the system can identify the location of the tool 699 or rig relative to the material being worked on. The captured images which are analyzed against the map 684 may include characteristics of the material such as wood grains and deformations or may include markers placed on the material. Different aspects of the mapping and location technology will be described in more detail below.

The user may then input or load a design 686 or template into the smart device 681, adjust the size of the design 686 relative to the map 684 of the material to provide the user with a desired working path on the material being worked on.

In operation, as the system or rig 680 is moved by the user along the material being worked the smart device 681 processes the captured images from the camera 682, determines the location of the rig 680, and provides a desired path to the user on display 689. Once the user has placed the rig 680 close to the desired path the rig or system 680 automatically adjusts the position of the tool 699 to achieve the precise working path stemming from the loaded design 686. The term "rig" and "system" are used interchangeably in the description of the present invention. However, the rig primarily refers to the physical device itself including all attachments. The system refers to the physical device, all attachments, and all related technology and software code embedded or included in some of the physical elements.

The system 680 adjusts the precise location of the tool 699 by adjusting the geo location of the stage 690 or a moveable platform that the tool 699 is attached to. The stage 690 is connected to an eccentric coupled to a motor shaft. As the motor shaft moves in a circular path the eccentric moves the stage 690 in complex arcs and paths. A pivot 694 is connected to the stage and is also connected to an eccentric coupled to a second or pivot motor shaft. The pivot 694 is able to pull or push the stage 690 to achieve controlled movement of the stage within a 360 degree range. The ultimate effect is that the eccentrics can be rotated to position the stage in almost any XY position in the range.

The system 680 may use a reference lookup table which provides motor coordinates related to stage positions, or uses calculations to adjust the motors and move the stage 690 and the cutting bit of the tool 699 connected to the stage 690 to the desired location. Further, the tool 699 through movement of the stage 690 and pivot 694 is capable of movement in 360 degrees of movement in a two dimensional plane. Essentially, the cutting instrument of the tool can be moved anywhere within the 360 degree window of the target range 408 (see FIG. 15).

In the exemplary embodiment, the stage 690 and pivot 694 are moved by electric motors. The stage motor 210 is controlled by a stage motor controller 691 and the pivot motor 220 is controlled by a pivot motor controller 695. The stage motor controller 691 and pivot motor controller 695 receive information on the desired location or coordinates from the smart device 681. Based on the received information the stage motor controller 691 and pivot motor controller 695 activate and control their respective motors 210, 220 to place the stage 690 and the pivot 694 in the proper position which places the tool in the desired geo location.

The smart device 681 may also communicate with, receive information from, and control the tool 699. Such control could include sending instructions to power on or off, increase or reduce speed, when to engage the material being worked such as adjusting the depth of the tool 699 when the user is close enough to or near the desired path on the material.

The form and structure of an exemplary embodiment of the present invention for use with a cutting tool is provided and depicted in FIGS. 1-9. The exemplary embodiment of the present invention depicted in FIGS. 1-9 provides a system or rig 100 which is configured for use with a router 500. The system 100 includes two support legs 104 which are attached to a base housing 130 on the lower end and terminate into a device mount 122 at the upper end. The device mount 122 includes left and right display clips 124 to clamp or lock the monitor or smart device 570 into the device mount 122. The device 570 includes a display screen 572 for the user to view the cutting path for that particular use. The base 130 also has left and right handles or grips 106 attached through handle support arms 108.

Figure 8:
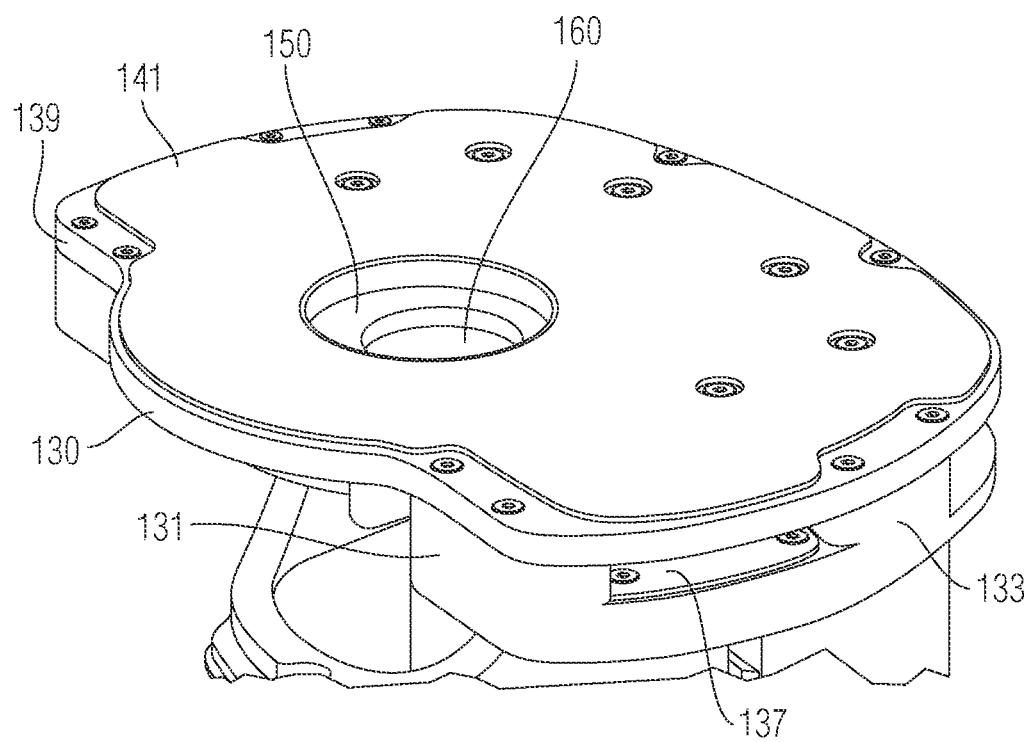
FIG. 8 provides a perspective view of the bottom of an exemplary embodiment of the present invention without a tool attached.

The lower end of the base 130 has a bottom plate 139 which encloses the stage 150 and a lower stage skid pad 151. The base 130 and bottom plate 139 are fastened to one another such as by machined screws. As seen in FIG. 8, the bottom plate 139 has a bottom skid pad 141 attached to the bottom. The bottom skid pad 141 is used to assist movement of the rig 100 along the surface of the material being worked on. The bottom skid pad 141 may be made of a high density polyethylene, Teflon, or other suitable material which is both durable and suited for sliding along the material.

Figure 9:
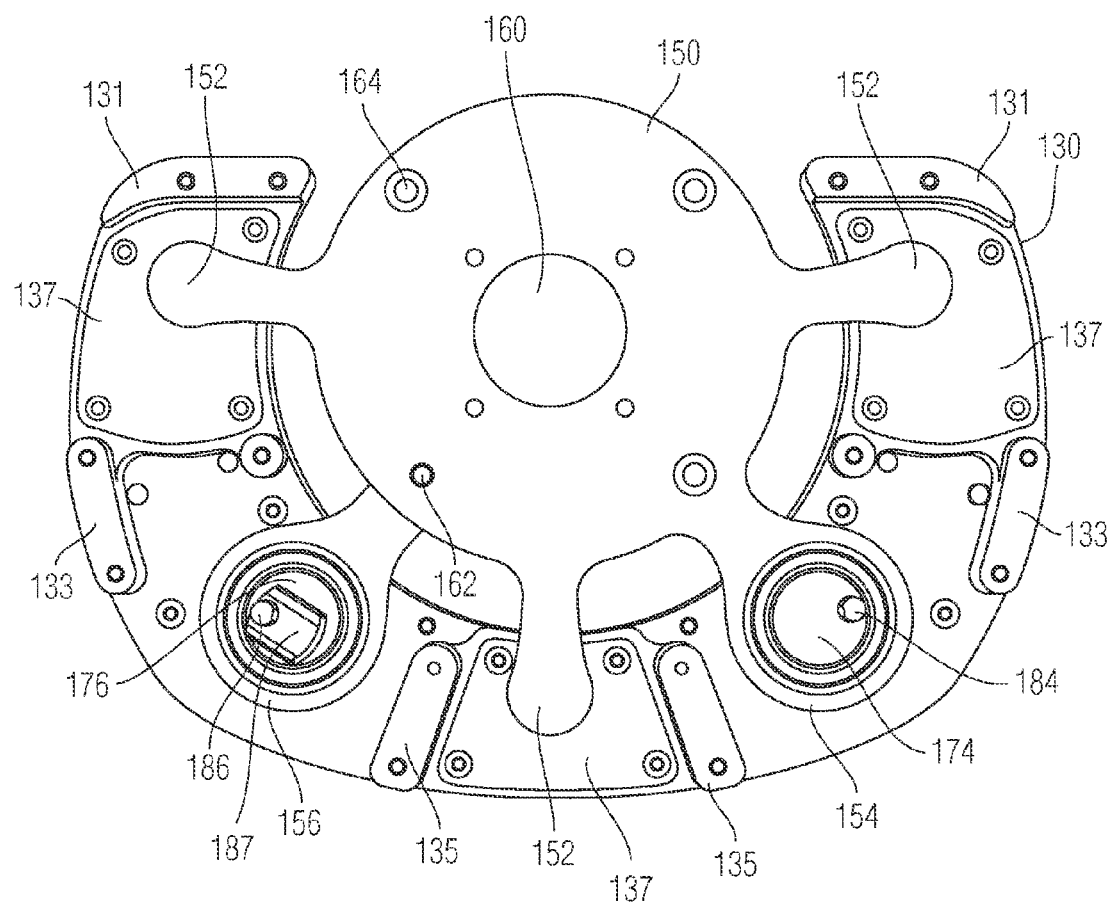
FIG. 9 provides a bottom view of the internal stage and pivot components an exemplary embodiment of the present invention.

The router 500 is added to the rig 100 by attaching the router base plate 510 to the stage 150. As seen in FIG. 9, the stage 150 has several tool attachment points 164 for attaching the router base 510 to the stage 150. The router base 510 has several router base support legs 508 which forms a cage around the router bit 512. The router 500 also has a power cord 506 and an on-off switch 504. As mentioned previously, the rig 100 may be implemented as a self contained portable unit including an on-board source of power, such as a battery source.

The smart unit or monitor 570 has an input cable 574 with a cable terminal or receptacle 576. If the device is a smart unit the CPU, software, and memory will be on the device itself. If the device 570 is simply a monitor then the cable 574 and receptacle 576 will connect to the CPU unit.

As best seen in FIGS. 2-7, the system 100 contains a stage motor 210 and a pivot motor 220. The stage motor 210 is used to control movement of the stage 150. The pivot motor 220 is used to control movement of the pivot arm 156 which pulls or pushes the stage 150 to convert the rotational motion of the motors 210, 220 into a relatively linear motion. The stage motor 210 and pivot motor 220 each have their own motor cap 212, 222 respectively.

The motors 210, 220 are controlled by the stage motor driver 253 and the pivot motor driver 254 which are connected to the printed circuit board 250 and the microcontroller board 252. The microcontroller 252 processes low level instructions from the smart device or CPU unit (i.e. a laptop). The instructions would be instructions to move the motors 210, 220 to set positions (i.e. positions 150, 125) into the correct step commands to drive the motors to those positions. The motors' orientations are tracked by homing them to a zero position once and then tracking all subsequent steps taken. Alternatively, the system could use rotary encoders to keep track of the state of the motor shafts' orientations. The motors 210, 220 and the motor drivers 253, 254 are powered by connecting the power plug receptacle 255 into a power source.

Figure 3:
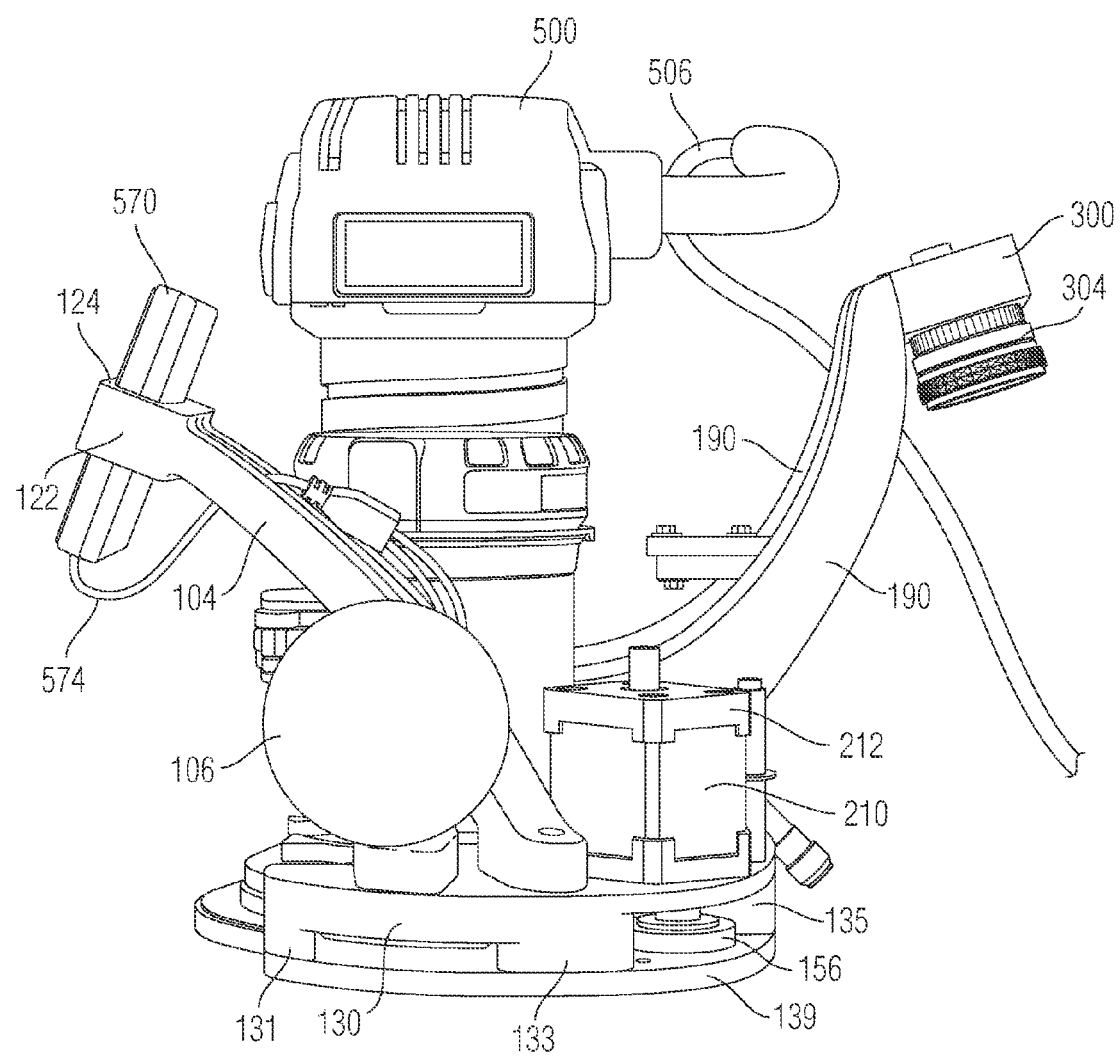
FIG. 3 provides a side view of an exemplary embodiment of the present invention with a router attached.
Figure 4:
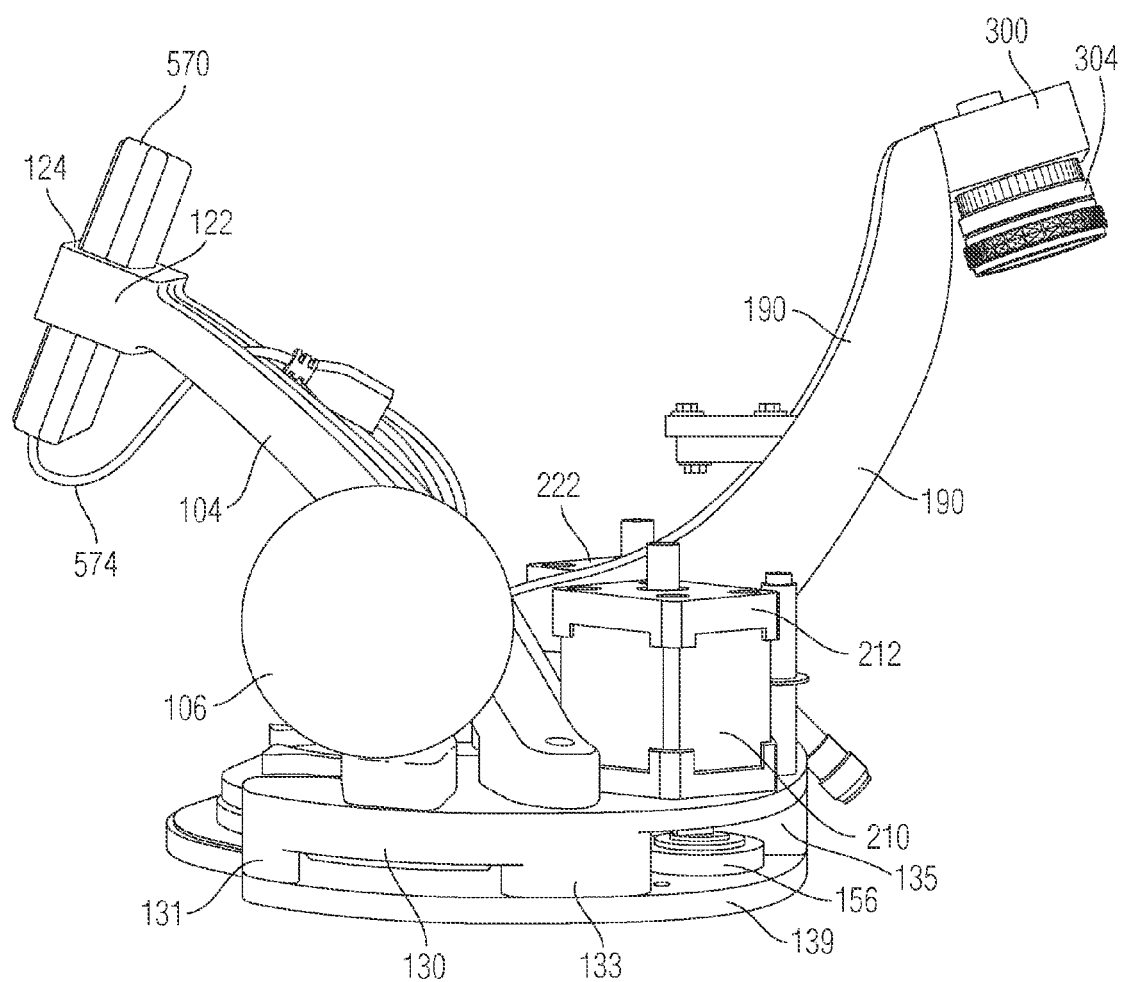
FIG. 4 provides a side view of an exemplary embodiment of the present invention without a tool attached.
Figure 5:
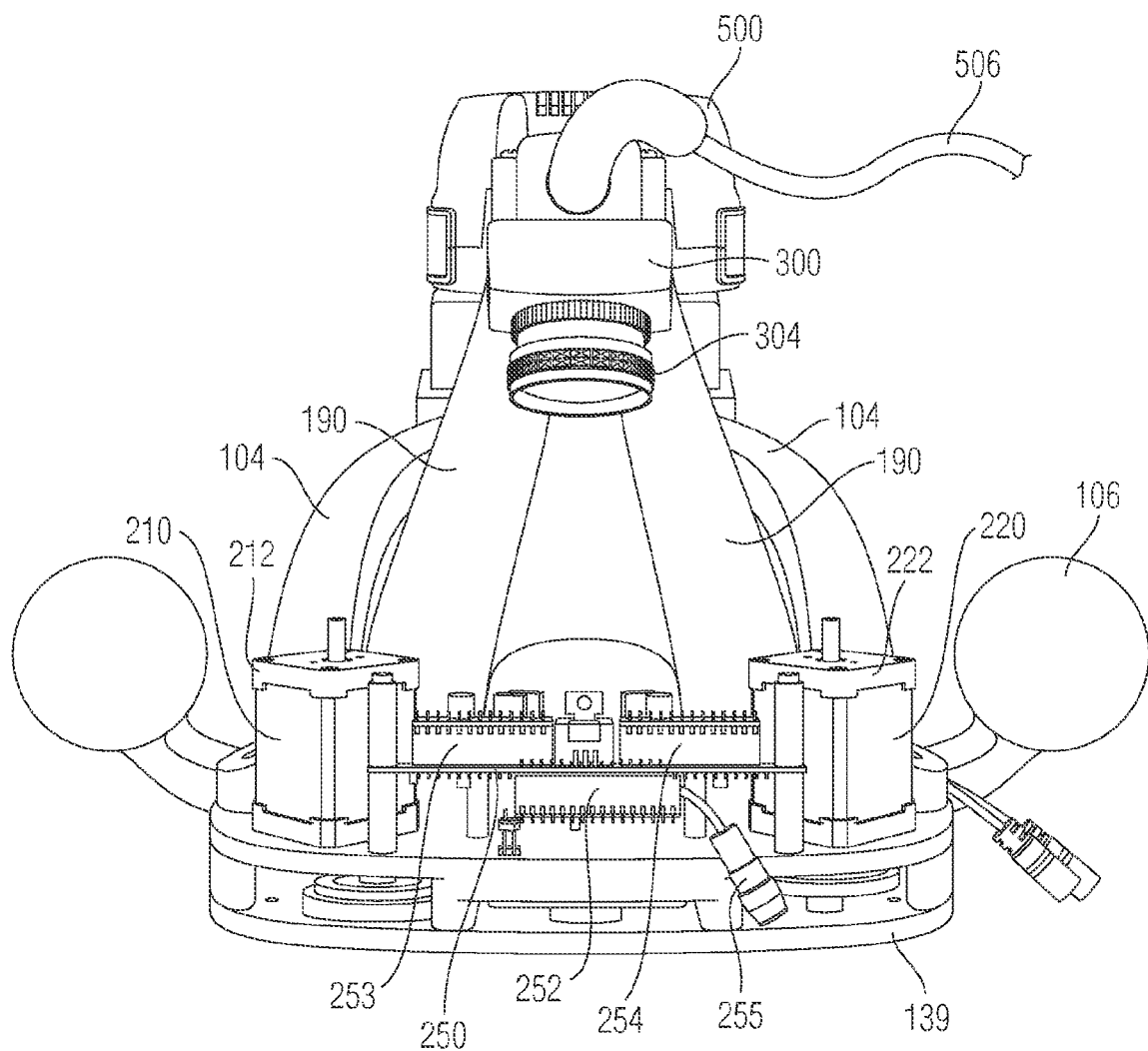
FIG. 5 provides a rear view of an exemplary embodiment of the present invention with a router attached.
Figure 6:
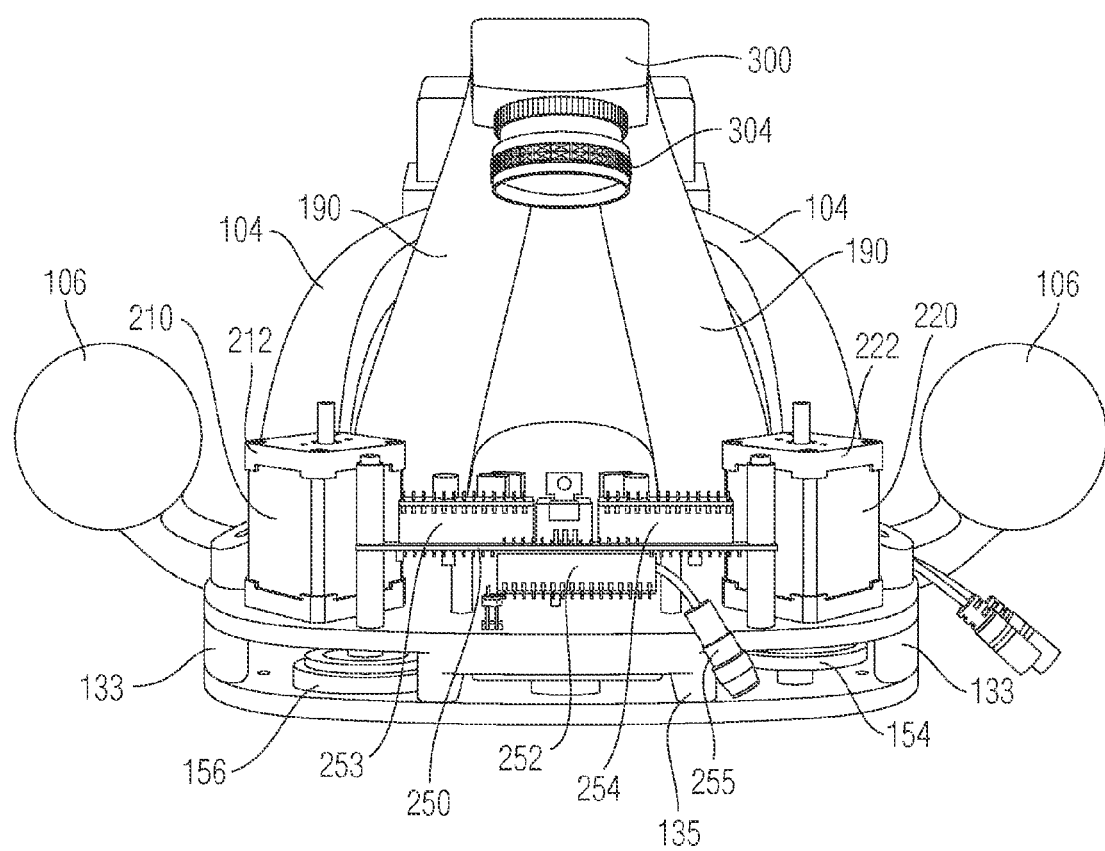
FIG. 6 provides a rear view of an exemplary embodiment of the present invention without a tool attached.
Figure 7:
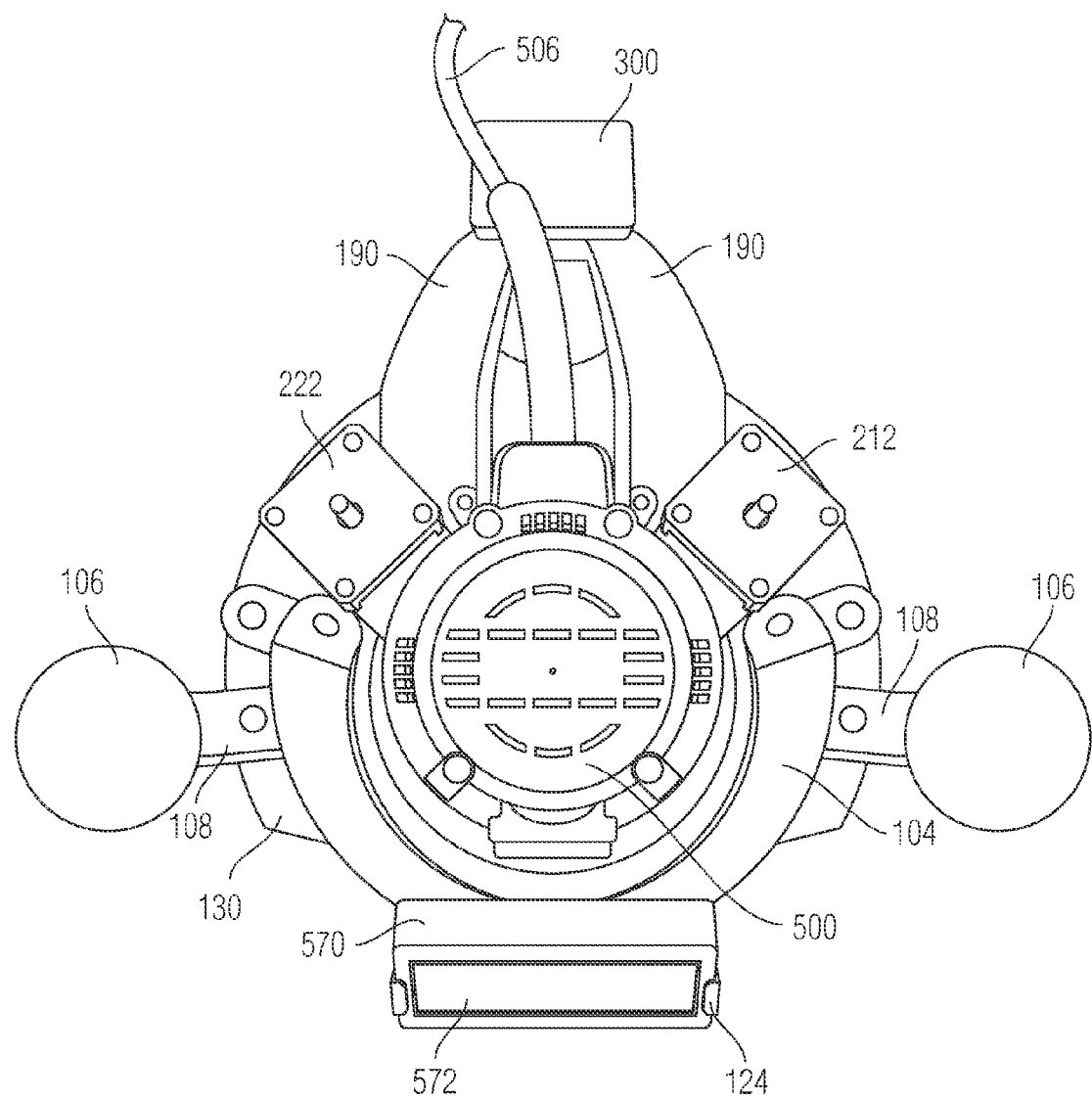
FIG. 7 provides a to view of an exemplary embodiment of the present invention with a router attached.

As seen in FIGS. 3-4, the back of the rig 100 includes a camera support 190. The camera support 190 may be one or more support members which are connected to the upper stage housing 130 and terminate at the top of the rig 100 where a camera 300 is mounted. The camera 300 and a lens 304 are placed in a relatively downward position to capture images of the material being worked and the surrounding areas thereof.

In this exemplary embodiment, eccentrics were used to convert the rotational motion of the motors into linear motion. Eccentrics are circular disks rotating around an off-center shaft. As the shafts are rotated, they produce linear motion in the collars wrapped around the eccentric disks. Eccentrics are able to maintain the same low backlash accuracy of a precision linear stage while being less expensive. A linear displacement range of ½" is well within the capabilities of an eccentric. The present exemplary embodiment consists of two eccentrics mounted to the frame and connected to a stage that can slide on its base. The eccentrics are rotated by stepper motors, and by rotating them the stage can be moved within the frame. The size and shape of the various eccentrics can be varied to provide larger or smaller relative movement of the tool 699 relative to the workspace.

To properly constrain the stage, one eccentric is connected directly to the stage by a ball bearing coupling, while the other is connected by a coupling and a hinge. This linkage design results in a nonlinear relationship between eccentric orientation and stage position. Near the center of the range moderate rotation of an eccentric produces moderate motion of the stage. In contrast, near the edge of the range much larger rotations are necessary to move the stage a fixed amount. In the present invention, stage displacement is limited to approximately 95% of the maximum range to avoid positions with extreme nonlinearity. This linkage design also permits back driving, in that forces acting on the tool can cause the cams to rotate away from their target positions. However, the present invention makes use of adequately powered motors which have sufficient power to preclude back driving even in the presence of significant forces.

As seen in FIG. 9, the upper stage housing 130 is a one piece unit with spacers 131, 133, 135 machined or formed into the upper stage housing 130. The spacers 131, 133, 135 provide the required space for the stage 150 and pivot arm 156 to move. The front spacers 131, side spacers 133, and rear spacers 135 need not be formed as one unit. Instead, the front spacers 131, side spacers 133, and rear spacers 135 could be separate pieces attached to the upper stage housing 130. The upper stage housing 130 also accommodates several upper stage skid pads 137. The upper stage skid pads 137 allow the stage stabilizing arms 152 to move along the pads 137 with minimal friction.

The stage 150 is ideally made of a light but durable and strong material such as aluminum or some other alloy. The stage 150 is most likely machined to include one or more stabilizing arms 152, the stage eccentric arm member 154, tool attachment points 168, and an opening 160 where the tool extends through the stage 150. In addition, a pivot arm 156 is most likely machined from the same alloy or material as the stage 150.

In operation the stage motor 210 moves in response to rotation of the stage motor shaft 184. There is a stage eccentric cam member 174 attached to the stage motor shaft 184. When the stage motor shaft 184 rotates the stage eccentric cam 174 rotates and the cam design causes the stage arm member 154 connected to and surrounding the cam 174 to move the stage 150. A bearing ring may be used between the cam 174 and the stage arm member 154.

Additionally, when the pivot motor 220 moves the pivot motor shaft 186 rotates. There is a pivot eccentric cam member 176 attached to the pivot motor shaft 186. When the pivot motor shaft 186 rotates the pivot eccentric cam 176 rotates and the cam design causes the pivot arm member 154 connected to and surrounding the cam 176 to move the pivot arm 156 back and forth which causes the stage 150 to move relative to the pivot arm 156. A bearing ring may be used between the cam 176 and the pivot arm 156.

As the stage 150 and pivot arm 154 move, the stage stabilizing arms 152 move along the upper stage skid pads and the lower stage skid pad 151 (see FIG. 1) to stabilize the stage 150 during movement. Further, the stage eccentric 174 and pivot eccentric 176 include a boss. The boss gives the eccentric 174, 176 some extra material to house the set screw which clamps on the stage motor shaft 184 or pivot motor shaft 186, thus securely attaching it to the respective eccentric 174, 176. The pivot eccentric boss 187 is seen in FIG. 9. The stage eccentric boss is not shown in the figures as it is flipped relative to the pivot boss 187 because the stage 150 and the pivot arm 156 are operating on different planes.

Figure 15:
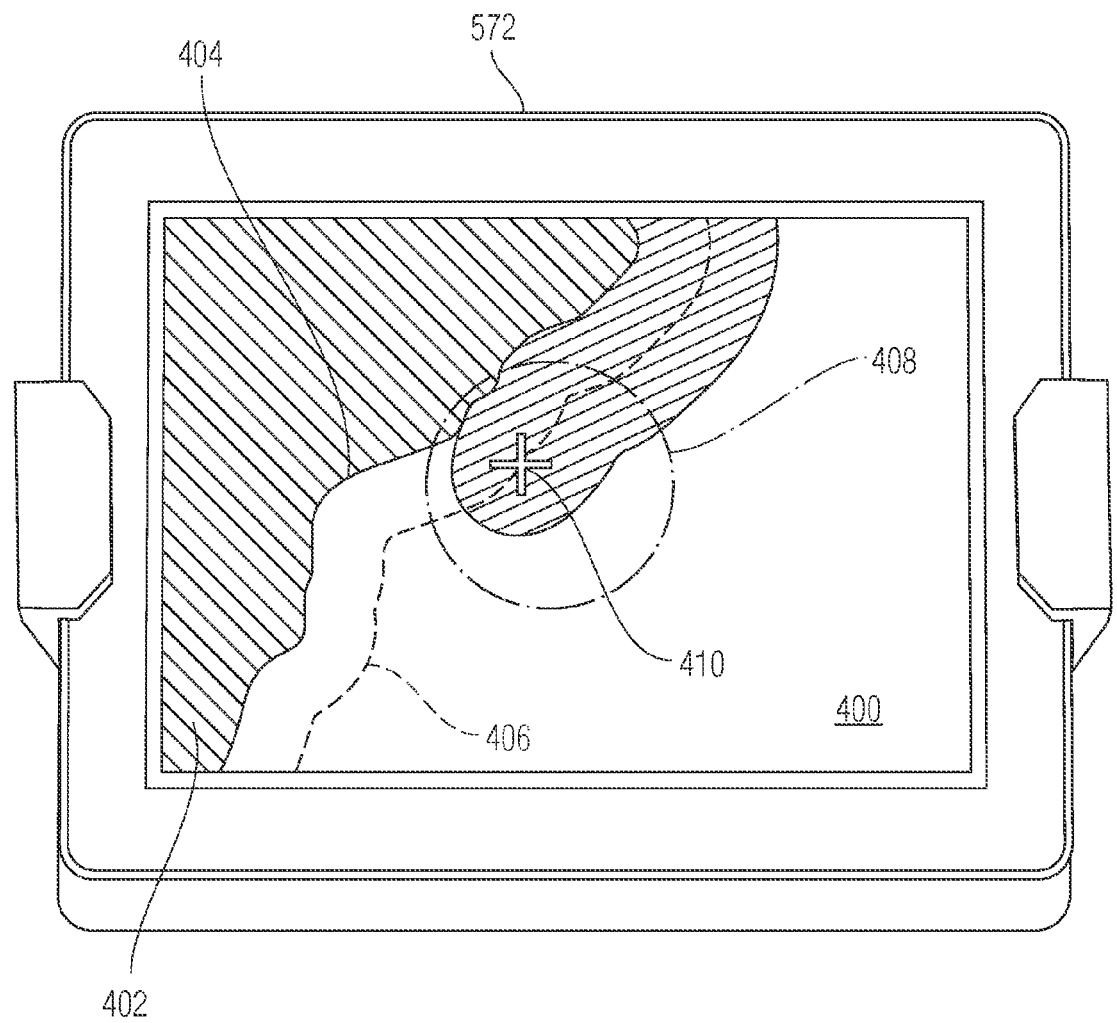
FIG. 15 provides a representation of the graphical user interface provided on the display of the system.

By way of example, FIG. 15 depicts the monitor or display 572 as the user pulls or pushes the rig 100 using the handles 106. The router bit 512 (as shown by the crosshairs 410) of the router 500 cuts the material 402 being worked on. The user sees the intended path 404 (as shown in dashed lines) of the design on the display 572 of the monitor or smart device 570. The display 572 shows the desired path 406 as well as the target range 408. The target range 408 is related to the range of movement of the stage 150 and correspondingly the attached tool. Thus, if the range of movement of the router is generally 0.5 inches in any direction from its center point then the target range 408 would best be defined as a circle with a one inch diameter since the router bit can only move 0.5 inches from the center point. Thus, the user would need to move the router bit 410 within 0.5 inches of the intended path 404. Once the rig 100 is within 0.5 inches of the target range 408 the CPU would automatically identify a target point on the intended path 404. The CPU would send instructions to the motor controllers to move the stage 150 to the appropriate coordinates which correspond with the bit 410 reaching the target point and cutting along the intended path 406. It's important to note that the system can account for the width of the cutting bit 410. If the system were to place the router bit 410 directly on the intended cut path 404 the width of the router blade would cause the router to remove material beyond the intended cut path 404. The system accounts for the width of the cutting bit 410 by setting the desired path 406 some distance from the intended path so that the bit 410 only takes out material up to, but not beyond, the intended cut path 404. Since cutting elements or bits have different widths the system can be adjusted to remove or vary the bit width adjustment or the gap between the intended cut path 404 and the desired path 406.

As the system cuts or reaches one target point, the system would identify a next target point and continue in this process cutting along the intended path in a clockwise direction. The user would continue to pull or push the rig 100 via the handles 106 keeping the intended path (a line or area) within the target range 408 as seen on monitor 572. A more detailed flow and process is described in conjunction with FIGS. 10 and 11.

Figure 10:
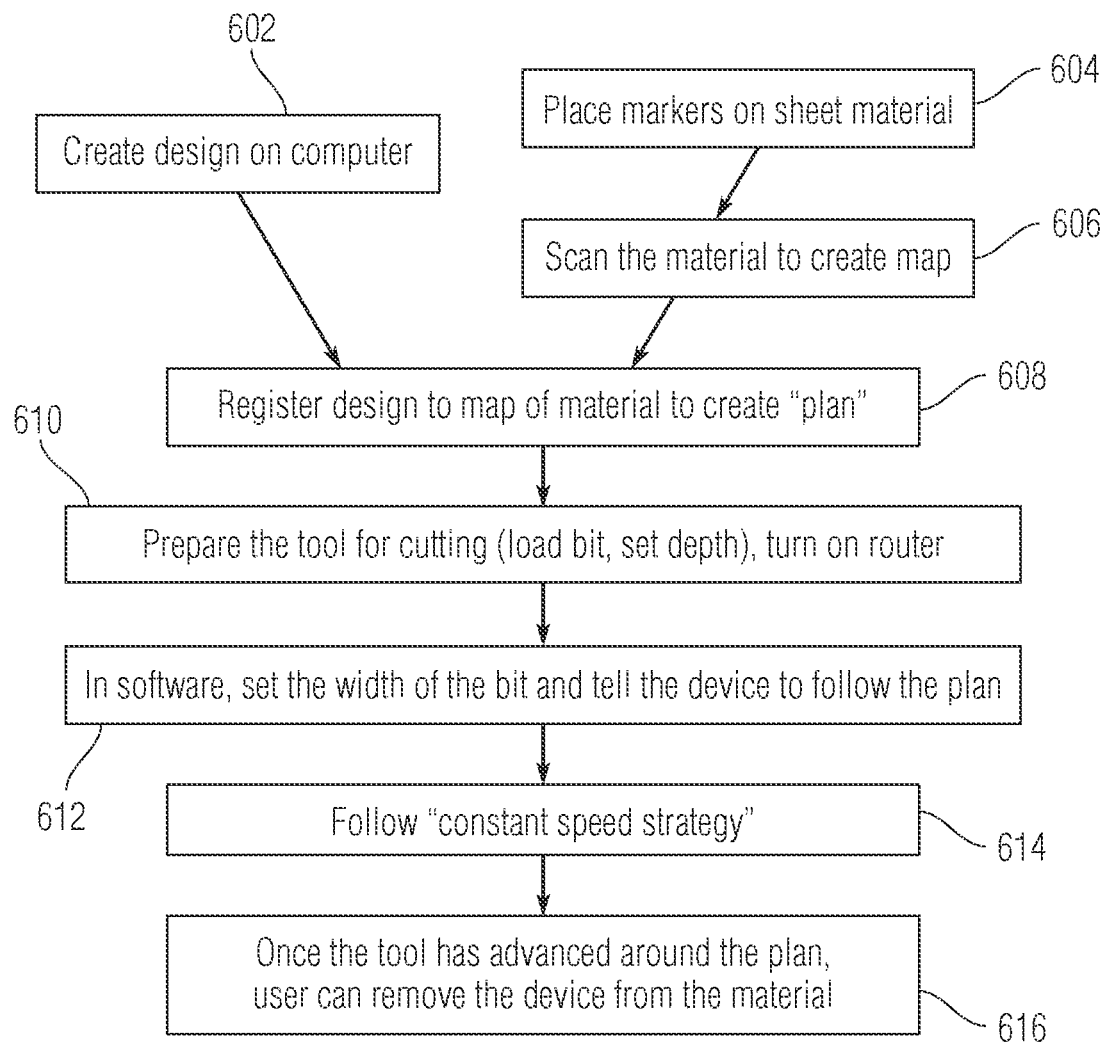
FIG. 10 provides a flow chart of the steps performed by the present invention during operation.

FIG. 10 provides a flow chart showing the steps or method 600 for cutting a working surface using the router based embodiment of the present invention. First in step 602 the user would find or create a design they want to cut out of a material. The user would then need to map the sheet of material. If the material has enough markings the user could use the material itself. However, in step 604, if the material has a flat surface or limited markings the user can place markers on the material. Such markers might include printer marker stickers and/or any other type of suitable indicia capable of being readily identified.

In step 606, the user uses the camera technology to scan the material and the various markers to create the map. The CPU processes the images captured by the camera and generates the map. The size and shape of the map can be appropriately manipulated to a preferred configuration. The design is then registered to the map to create a cutting plan (step 608).

In step 610, the user prepares the cutting tool by loading, adjusting, or securing the bit, mounting it to the rig and turning the router on. In the alternative, and as mentioned previously, it is to be understood that the turning on of the router can be a software initiated process in response a variety of parameters, as opposed to a mechanical switch, such as motion sensing of a movement of the rig 100 in a particular direction by the user, or the like.

In step 612, the user may set a few elements, such as width of the bit of the cutting tool, the range of the tool's desired range correction, the size of the cross-hair, the speed of the cutting tool, and the like. Thereafter, instructions may be provided to the software to begin.

In step 614, the rig is placed adjacent to the desired path so that the system can automatically adjust the position of the tool into a starting adjustment range position along the desired path. The user then follows the "constant speed strategy" as will be described in more detail with regards to FIG. 11. Once the tool has advanced fully around the plan (step 616) the user can remove the device and work product from the material.

Figure 11:
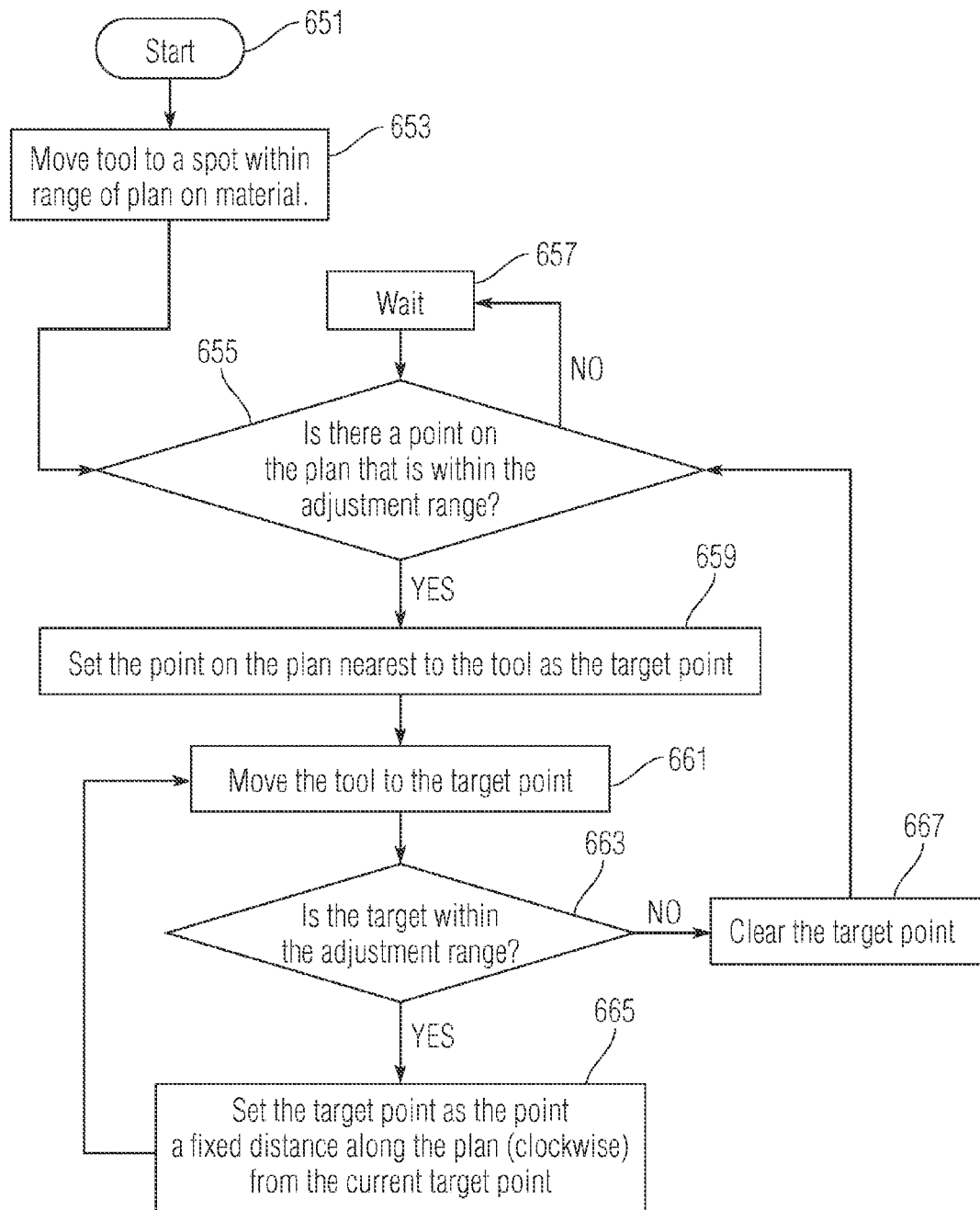
FIG. 11 provides a flow chart of the steps performed by the present invention during the constant speed process.

FIG. 11 provides a flow chart of method 650 for the constant speed strategy. The process in FIG. 11 assumes the user already has the router attached to the jig and has mapped their material and loaded up their design. The user then starts (step 651) the process to cut the material.

In step 653, the user must move the tool to a spot within the range of plan or path on the material. Once the user has moved the rig with the router tool to a spot within range of the intended path, the system in step 655 determines based on its location if there is a point on the plan within the adjustment range of the rig. If not, the system in step 657 may send a notification and waits until the user moves the device within the adjustment range.

In step 659, if there is a point within the adjustment range the system sets the point on the plan nearest to the tool as the target point. The system in step 661 then moves the tool to the target point and cuts the material.

The system then attempts to create a second target by determining in step 663 if a new target is within the adjustment range. If there is a second target, the system in step 665 sets the second target point as the new target and the device continues to move in a clockwise direction cutting from the old target point to the new target point. As the tool or router is cutting from the old target point to the new target point it is also attempting to identify the next target point within the adjustment range (step 663). The determination of an optimum second target may be continuous, and based on the image, or various images, detected from the camera and processed by the system.

If not, the system (in step 667) clears the target point and starts back at step 655 to determine if there is a point on the plan within the adjustment range. This process continues until the tool has gone through the entire plan in a particular direction, such as a clockwise direction.

As previously discussed above, FIG. 12 provides a system diagram of the main components of the present invention. The system 680 makes use of a smart device or system 681 which includes a CPU 683, software code 685 which performs one or more processes, memory 687, and a display 689. The smart device 681 may be one contained unit which mounts onto the display mount 122, 124 or may have one or more components separated but connected. For example, the system may be connected to a laptop or remote CPU 683 which contains the software code 685 and memory 687 yet is tethered to a monitor 689. The monitor 689 may mount to the display mount 122, 124.

The camera 682 is used to build a map 684 of the material to be worked on as well as determine the location of the rig 100 on the material. As discussed, the system may use CV technology and other sensors to build a photo mosaic map 684 of the material or could use the SLAM process. SLAM makes use of a sensor that in combination with a processor 683 and related software 685 is able to build a map 684 of the material being worked on while simultaneously determining the location of the tool 699 relative to the map 684.

Through the present invention, as previously described, the system 680 is able to locate a tool 699 or the working bit of a tool 699 on the surface of a material being worked. The system 680 is able to locate the tool 699 on the material using a camera 682 positioned some distance away from the material based on looking and or mapping at the material. In one implementation, the camera 682 is first used to build a map 684 of the material and is then used to locate itself (or the tool) on the map 684.

The map 684 can be built by having the user sweep the camera 300 in an arbitrary path over the surface of the material until the entire area of interest has been covered. The camera 682 can be removed from the rig 100 for this step. The images from this sweep are then stitched together by the CPU 683 using the image mosaicing software code 685 to form a cohesive map 684 of the area of interest of the surface of the material. Then, the user can return the camera 300 to the rig 100. Once the map 684 is formed and saved in memory 687 whenever the camera 682 takes an image of the material it has mapped, it can be matched against the map 684 held in memory 684 and its position and orientation determined.

This process may have an extra step in allowing the user to create and load a design 686. After the map 684 has been assembled on the smart device 681 (such as a computer), the user may create a design 686 on the computer by plotting it directly on the generated map 684. For example, the user may mark positions on a piece of wood where a drill hole is desired. All the techniques and features of the software code 685 (include computer aided design and manufacturing) can be employed to create a design with accurate measurements. Then, when the user returns to the material, the position of the camera 682 on the map 684 can be displayed on a screen or display 689 to the user, with the design plan 686 overlaid on the map 684. Essentially, the system 680 is able to identify the geo location of the tool relative to the map. So, in the example of drill holes, the camera 682 could be attached to a drill and used to determine the position of the drill exactly relative to the target drill locations specified in the design 686, enabling the user to line up the drill precisely.

A significant advantage of such a system is that it eliminates measurement mistakes, as all measurements are performed on the computer 681. Measurement is traditionally one of the most common sources of error and such error would be negated by the present mapping and location aspects of the present invention.

Although described herein in combination with a router and separately with a drill bit, the camera 682 could be attached to any tool 699 to provide positioning for that tool 699. The camera 682 could also be coupled with a display 689 and CPU 683 and become part of a computer or smart device 681 that can be attached to any tool 699. Further, a software application or code 685 could be installed on a mobile Smartphone (such as an iPhone) utilizing the camera, CPU, memory, and display already part of the Smartphone.

The system may perform the mapping and positioning steps simultaneously (i.e. "SLAM", Simultaneous Localization and Mapping) and the system 680 may use a video or still camera 682. The camera 682 may be directed downward at the surface of the material, it could be positioned at any angle, and it could sit at any vantage point on the tool 699 or rig 100 (FIG. 1).

During the phase when the camera 682 is being used to locate itself on the material, having low lag between moving the camera 682 and detecting that movement can be important. One way to decrease lag is to use a high-frame rate camera 682. However, these can be expensive. An alternative is to use a relatively low-frame rate camera 682 coupled with one or more optical sensors such as are present in optical mice. The optical sensors provide low-latency dead reckoning information. These sensors could be used in conjunction with the camera 682, for example in a configuration where the camera 682 provides accurate global position information a few times a second and appreciable lag, and the optical sensors are used to provide dead-reckoning information with low lag that fills in the time since the last image was taken. The system could also make use of multiple cameras to increase the accuracy or range of coverage when scanning, or to provide depth information.

There are also numerous options for creating, capturing, or loading the design 686. Designs could be downloaded or otherwise obtained from others including by purchasing designs online and uploading to the smart device or computer 681. Rather than creating the design 686 on a separate computer and then uploading to the device 681 the system 680 could be used to capture a map not only of the surface but of the design 686 on that surface. This could be useful for setting up the system 680 to follow a specific line or to show the user an image of the surface of the material underneath a large tool which obstructs sight, or to show the surface with a drawn plan in a pristine state before it is covered with debris or the surface on which the plan is drawn is cut away. Alternatively, the design 686 could be designed, altered, or manipulated from its original form on the device 681 through a menu driven interface allowing the user to input distances, angles, and shapes or to free hand a drawing on a touch sensitive pad or display.

In an exemplary embodiment, the software 685 is able to build the map and track the camera's position using visible features of the material such as grains, imperfections, and marks. However, some materials, such as solid-colored plastic, may be too undifferentiated for this to work. In these instances, the user may alter the material surface in some way to add features that can be tracked. There are many possible ways this could be done: the user could apply ink to the material that is typically invisible, but which can be seen either in a non-visible spectrum or in the visible spectrum when UV light is applied (or similar), allowing the camera to track the pattern of the invisible ink while not showing any visible markings once the work is done. Alternatively, the user could apply stickers with markers which can later be removed. Features could also be projected onto the material such as with a projector. Or, if the user will later paint over the material or for other reasons does not care about the appearance of the material, the user could simply mark up the material with a pencil or marker.

In cases where the camera cannot track the material, or cannot do so accurately enough, or the material is unsuitable for tracking (e.g. due to an uneven surface), or any other reason that prevents the camera tracking the surface directly, the camera may instead track other markers off of the material. For example, the user could put walls above, below, or around the sides of the material being worked on that have specific features or marks. The features or marks on the surrounding surfaces enable the camera to determine its position on the material. Alternatively, different types of positioning technology or devices could be used to locate the tool 699 or stage 690, possibly in conjunction with a camera 682 that is used mainly for recording the visual appearance of the material without needing to perform the tracking function. Such could be the use of ultrasonic, IR range finding, lasers and the like.

Figure 13:
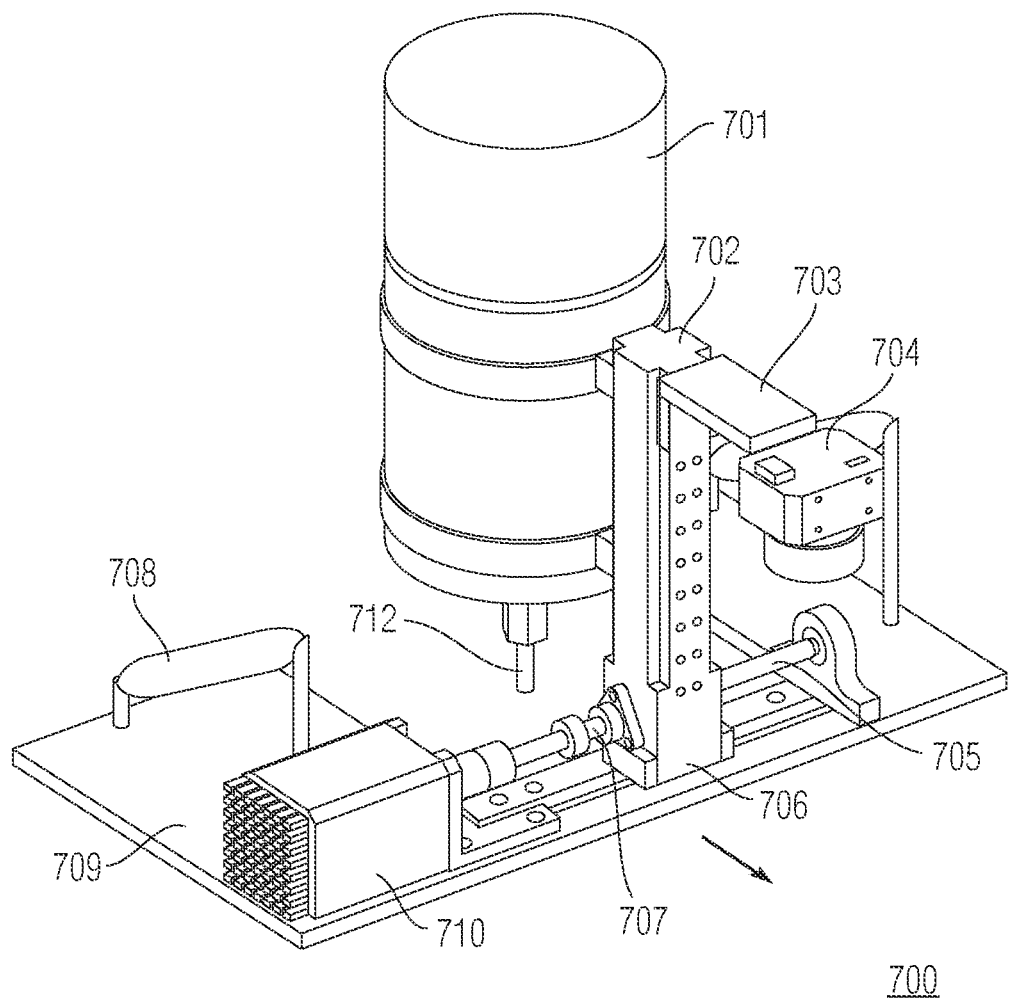
FIG. 13 provides a perspective view of a second exemplary embodiment of the present invention.

As previously discussed in conjunction with FIGS. 1-9, the present invention described a handheld computer controlled router system using an eccentric cam movement of a stage to control the router. However, eccentric cam movement is not the only design or method that can be employed to move a tool or stage. As seen in FIG. 13, a linear based design is depicted. The system 700 includes a router 701 which is mounted to a tool arm 702. The tool arm 702 is built on top of the linear stage base 706. The linear stage base 706 moves in a back and forth direction along the axis line formed by the lead screw 705 and the precision nut 707. Linear movement is achieved by controlling the stepper motor 710 which turns the lead screw 705 which moves the precision nut 707 forcing the linear stage base 706 to move. The stepper motor and end of the linear system are mounted on the base 709. Handles 708 are attached to the base 709 for users to move the system 700 on the material.

The linear system 700 would still use the camera 704 or sensor technology previously described to map the surface of the material and determine the coordinates or location of the device 700 on the material. The user would scan the material with the camera 704 to make a map as described above. Next the user would create, download, or otherwise obtain a design and register it onto the map of the material. Finally, the user would return to the material with the tool, and follow the cut lines of the plan as closely as possible. Typically, the user would grip the device 700 by the handles 708 and move the device forward while trying to keep the router 701 on the intended cut path or line. While doing so, when the user would inadvertently drift off of the exact cut line or path, the system would detect the error. Since the system 700 knows both its location and the plan it would power the stepper motor 710 to rotate the lead screw 705 to move the router 701 by moving the linear stage base 706 to such a point where the cutting bit intersects the plan line exactly. In this way, the present invention can be used to make complex, curved, and/or precise cuts that could not otherwise be made by hand.

Both the eccentric and linear embodiments could employ a monitor or display to communicate or display the location of the tool relative to the intended path. The system could also use other methods such as shining a laser point or line where the user should go or some combination thereof.

In certain instances, the tool may need to cut design, such as on a table top or sign, where the cut does not go all the way through and it takes more than one pass to remove all the material required for the design. In such instances, the CPU sends signals to the motors to move the router back and forth within the target range until all material has been removed in accordance with the design. The system can also be configured to provide a notice to the user to wait until all such material within the target range has been removed. The system can also notify the user when it has completed its design in a certain region thus notifying the user it is time to move forward to a new target area.

In addition, the router could be configured to follow a line drawn onto the material itself. In this embodiment, the camera would be placed at the front of the operating tool and would see the drawn line. The system would still use location mapping to stay accurate to the drawn line.

An alternative embodiment using various aspects of the present invention would be for use of the material mapping and tool location for use in printing. Again, the user would build a map and upload a design and would be able to print the design section by section on a large canvas. The system would know which color or colors to emit based on the design and location of the printing tool. After the user mapped the material and uploaded the design the user would simply pass the device over the material to print the image.

Figure 14:
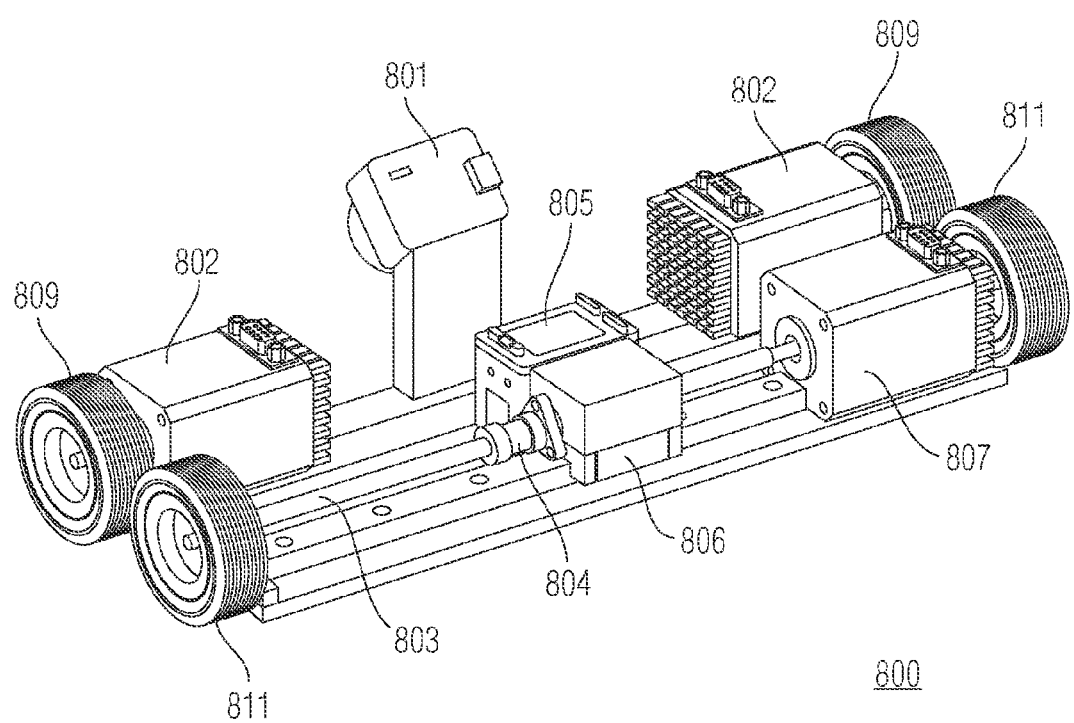
FIG. 14 provides a perspective view of a third exemplary embodiment of the present invention.

The printer embodiment could be manually guided or automatically positioned with wheels (or treads, or other) like a robot. As seen in FIG. 14, a printer embodiment 800 is provided. As with the tool based embodiments, the system 800 includes a camera 801 which is used to build a map of the surface and track the position of the device 800 on the surface. The printer head 805 can slide along a linear stage 806 powered by a stepper motor 807 which rotates a lead screw 803 which moves a precision nut 804.

In one instance, the user builds up a map of the surface and registers an image that is to be printed to that surface. The user then positions the device 800 at one side of the intended printed area. The camera 801 takes an image and determines its position on the surface. The printer head 805 is then moved from one end of the linear stage 806 to the other to lay down a strip of ink. The device 800 is then moved forward the width of one strip of ink (or slightly less to prevent gaps) by stepper motors 802 attached to wheels 809. The printer embodiment 800 also has wheels 811 which are merely to roll when the motor driven wheels 809 are driven. Once the printer 800 has determined its in the correct place for the next strip, the printer prints the strip of ink and repeats until the edge of the image has been reached. In this way, the printer 800 can lay down a band of ink as wide as a strip's length and arbitrarily long. At this point, the printer can either move itself to the next position to start laying down another band of ink, or the user can do this manually.

Various embodiments of the printer system 800 can work either in real time (i.e., printing as it is moving) or by taking steps (printing only when at a stop). Different embodiments can be made to suit different tasks: e.g., a high-speed, real-time version might be built to print billboards, which have low accuracy requirements, while a more precise, slower, step-taking device might be built to do accurate large-format printing, e.g. of posters. Either approach can also be made to work on a wall, which would make it possible to print murals, advertisements, or other images directly onto a wall, rather than having to print the image on wall paper and then stick it up. In addition, this tool could easily be made to work with curved surfaces, which are typically extremely difficult to cover with images.

The printer embodiment 800 could be adapted for use with any type of paint including inkjet, liquid or spray paints, markers, laser printing technology, latex based paints, and oil based paints.

The mapping phase could be also be bypassed if it was clear the material size was greater than the design. The user would simply determine a starting point that corresponds with a region on the design (i.e. the top right corner) and the system 800 would start painting the image. Such would be useful when painting many copies of a single image in many locations.

The embodiments discussed herein so far have focused on rigs which accommodate a tool being attached to a stage and the stage is moved or controlled by one or more motors. The linear design depicted a router moved by a motor where the router is connected to a linear stage. In such instances, the router is attached or mounted as a separate unit. However, the system could easily be designed as one unit where the stage, motors moving the stage, controllers, and all within the same housing and within the same power system as the housing and power of the tool. By way of example, the router housing would be enlarged to fit the stage and motors and might include a display integrated into the housing. Through such an embodiment, the form factor might be improved to look like a one piece tool.

The embodiments presented here are not meant to be exhaustive. Other embodiments using the concepts introduced in the present invention are possible. In addition, the components in these embodiments may be implemented in a variety of different ways. For example, a linear stage, or a hinge joint, or an electromagnetic slide, or another positioning mechanism may be used to adjust a tool or the stage the tool is on in reaction to its detected position and its intended position.

By way of example, the present invention could also be used with drills, nail guns, and other tools that operate at a fixed position. In such embodiments, the tool and software could be modified such that the plan consists of one or more target points instead of a full design. The device could be moved by the user such that a target position is within the adjustment range. The software could then move the tool to the correct target position. The user could then use the tool to drill a hole, drive in a nail, or whatever the desired function is.

Alternatively, these tools can also be used without automatic adjustment. The stage, pivot, motors, and eccentrics could be removed. The tool could be attached to the lower stage housing. The software could be modified such that the plan consists of one or more target points. The user could move the device such that the tool is directly over the target position. The user could use the location feedback provided on the display to perform accurate positioning.

In an alternative embodiment, the present invention could also be used to position a jigsaw. A jigsaw blade can be rotated and moved in the direction of the blade, but not moved perpendicular to the blade or it will snap. The present invention could be modified to include a rotating stage which would be placed on top of the positioning stage. The jigsaw would be attached to this rotating stage. The software would be modified to make the jigsaw follow the plan and rotate to the correct orientation, and made to ensure that the jigsaw was never moved perpendicular to the blade. A saber saw could also take the place of the jigsaw to achieve the same effect. The cutting implement would be steered by rotating the rotating stage, and the cutting implement could be moved along the direction of cutting by moving the positioning stage.

Another possibility would be to only support rotation and not support translation. This could be done by automating the orientation of the blade in a scrolling jigsaw (which is a jigsaw with a blade that can be rotated independently of the body). In this embodiment, the software would only steer the blade to aim it at the correct course; the user would be responsible for controlling its position.

The present invention could also be used to position a scroll saw. In this embodiment, the camera would be on the scroll saw, and the user would move the material. The upper and lower arms of the scroll saw could be mechanized such that they could be independently moved by computer control. The user would then move the material such that the plan lay within the adjustment range of the scroll saw, and the software would adjust the scroll saw to follow the plan. The upper and lower arms could be moved to the same position, or moved independently to make cuts that are not perpendicular to the material.

The invention could also be used in an alternative embodiment where the position correcting device is mounted to a mobile platform. In this embodiment, the device could be placed on material and left to drive itself around. The invention could also be used in an alternative embodiment in which two mobile platforms stretch a cutting blade or wire between them. In this embodiment, each platform could be controlled independently, allowing the cutting line to be moved arbitrarily in 3D, for example to cut foam.

The invention could also be used as an attachment to vehicles or working equipment such as a dozer in which the position-correcting mechanism is mounted on the vehicle. In this embodiment, the vehicle could be driven over a sheet of material such as steel plate lying on the ground, and a cutting tool such as a plasma cutter could be used to cut the material. The invention could also be used as a plotting device or painting device, for example to lay out lines on a football field or mark a construction site.

Although SLAM was described as the exemplary mode for mapping and determining the location of the tool 699, it is to be understood that various other location processing and determining technologies are possible, such as, but not limited to, integrating wireless position sensing technologies, such as RF, near field communication, Bluetooth, laser tracking and sensing, and other suitable methods for determining the position of the tool 699 on top of the work piece.

Although various steps are described above according to the exemplary method of this invention, it is to be understood that some of the steps described above may be omitted, and others may be added without departing from the scope of this invention.

It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed is:

1. A system to position a working member of a rig, the rig comprising a stage for receiving and holding the working member, and at least one motor for moving the stage, the system comprising:
   a processor in combination with one or more software applications;
   one or more sensors communicatively coupled to the processor, a first sensor of the one or more sensors configured to capture first information of a surface of a material; and
   a memory, communicatively coupled to the processor,
   wherein the one or more software applications, when executed, cause the system to:
      determine, based at least in part upon the first information, a first location of the working member using a map of the surface retrieved from memory;
      indicate, via a display screen of the rig, the first location of the working member relative to the map of the surface;
      register a design, retrieved from memory, to the map of the surface, to identify a path for the working member;
      compare the first location of the working member with the path to determine a second location for the working member corresponding to the path for the working member;
      control, responsive to the second location, a first one or more motors of the at least one motor to move the stage to position the working member at the second location to align the working member with the path; and
      control a second one or more motors of the at least one motor to maintain alignment of the working member with the path by moving the working member in a first direction as the rig is advanced in a second, different direction.

2. The system of claim 1, comprising:
   a second sensor configured to capture second information of the surface of the material, the second information comprising a plurality of images,
   wherein the one or more software applications, when executed, cause the system to use the plurality of images of the second information to build the map of the surface of the material.

3. The system of claim 2, wherein the first sensor and the second sensor are the same sensor.

4. The system of claim 1, wherein the one or more software applications, when executed, cause the system to:
   analyze the first information including information corresponding to one or more markers on the surface of the material to determine the first location of the working member using the map.

5. The system of claim 4, wherein the one or more markers comprise at least one of: a sticker, ink, invisible ink, a projected feature, a pencil marking, or a marker marking.

6. The system of claim 1, wherein the one or more software applications, when executed, cause the system to:
   provide the motor control information to control the at least one motor to move the stage to position the working member at a plurality of locations subsequent to the second location while the rig is advanced in a corresponding plurality of subsequent directions.

7. The system of claim 1, wherein:
   the rig performs a function performed by at least one of: a router, a drill, a nail gun, a jigsaw, a scroll saw, or a printer;
   the working member comprises at least one of: a cutting bit, a saw blade, a drill bit, a hammer, or a printer head; and
   the first sensor comprises at least one of: a camera, an ultrasonic sensor, an IR range finder, or a laser.

8. The system of claim 1, wherein:
   the first sensor is configured to capture image data; and
   the one or more software applications, when executed, cause the system to:
      receive the image data captured by the first sensor; and
      use the image data to compare a previous position on the path and a preferred next position on the path to realign a position of the working member using the at least one motor.

9. The system of claim 1, wherein the one or more software applications, when executed, cause the system to:
   receive the design from a computing device; and
   receive an indication to manipulate the design.

10. The system of claim 1, wherein the one or more software applications, when executed, cause the system to:
    indicate, via the display screen, the path relative to the first location.

11. The system of claim 1, wherein the one or more software applications, when executed, cause the system to:
    indicate, via the display screen, a range of movement for the working member.

12. The system of claim 1, further comprising:
    a skid pad proximate to the stage to facilitate movement of the stage,
    wherein the stage further comprises an attachment point to attach the working member to the stage.

13. The system of claim 1, wherein the first one or more motors comprises a same motor as the second one or more motors.

14. The system of claim 1, wherein the first one or more motors is different from the second one or more motors.

15. The system of claim 2, wherein the one or more software applications, when executed, cause the system to build the map of the surface by stitching the plurality of images together.

16. The system of claim 2, wherein the map comprises image data.

17. The system of claim 2, wherein the first information indicates a first one or more markers, and the map indicates a second one or more markers,
    wherein the system determines the first location based at least in part upon matching information corresponding to the first one or more markers from the first information to information corresponding to the second one or more markers from the map.

18. The system of claim 17, wherein the information corresponding to one or more markers from the map comprises information corresponding to one or more markers from each of two or more images from the plurality of images.

19. A computer implemented method of positioning a working member of a rig, comprising:
    capturing, by a first sensor communicatively coupled to a processor, first information of a surface of a material;
    determining, by a processor based at least in part upon the first information, a first location of the working member using a map of the surface retrieved from memory;
    providing information, from a processor, for displaying, via a display screen of the rig, the first location of the working member relative to the map of the surface;

registering, by a processor, a design retrieved from memory to the map of the surface, to identify a path for the working member;

comparing, by a processor, the first location of the working member with the path to determine a second location for the working member corresponding to the path for the working member;

controlling, by a processor responsive to the second location, at least one motor to move a stage to position the working member at the second location to align the working member with the path; and controlling the at least one motor to maintain alignment of the working member with the path by moving the working member in a first direction as the rig is advanced in a second, different direction.

20. The method of claim 19, comprising:

capturing, by a second sensor communicatively coupled to a processor, second information of the surface of the material, the second information comprising a plurality of images; and using, by a processor, the plurality of images of the second information to build the map of the surface of the material.

21. The method of claim 20, wherein the first sensor and the second sensor are the same sensor.

22. The method of claim 19, comprising:

analyzing, by a processor, the first information including information corresponding to one or more markers on the surface of the material to determine the first location of the working member using the map.

23. The method of claim 19, comprising:

capturing, by the first sensor, image data;

receiving, by a processor, the image data captured by the first sensor; and using, by a processor, the image data to compare a previous position on the path and a preferred next position on the path to realign a position of the working member using the at least one motor.

24. The method of claim 19, comprising:

providing information, from a processor, for displaying, via the display screen, a range of movement for the working member.

25. The method of claim 22, wherein the one or more markers comprise at least one of: a sticker, ink, invisible ink, a projected feature, a pencil marking, or a marker marking.

26. The method of claim 19, comprising:

providing, by a processor, motor control information to control the at least one motor to move the stage to position the working member at a plurality of locations subsequent to the second location while the rig is advanced in a corresponding plurality of subsequent directions.

27. The method of claim 19, wherein:

the rig performs a function performed by at least one of: a router, a drill, a nail gun, a jigsaw, a scroll saw, or a printer;

the working member comprises at least one of: a cutting bit, a saw blade, a drill bit, a hammer, or a printer head; and the first sensor comprises at least one of: a camera, an ultrasonic sensor, an IR range finder, or a laser.

28. The method of claim 19, comprising:

receiving, by a processor, the design from a computing device; and receiving, by a processor, an indication to manipulate the design.

29. The method of claim 19, comprising:

providing information, from a processor, for displaying, via the display screen, the path relative to the first location.

30. The method of claim 20, wherein the plurality of images are stitched together to build the map of the surface.

31. The method of claim 20, wherein the map comprises image data.

32. The method of claim 20, wherein the first information indicates a first one or more markers, and the map indicates a second one or more markers, wherein the system determines the first location based at least in part upon matching information corresponding to the first one or more markers from the first information to information corresponding to the second one or more markers from the map.

33. The method of claim 32, wherein the information corresponding to one or more markers from the map comprises information corresponding to one or more markers from each of two or more images from the plurality of images.

34. Non-transitory computer readable media storing instructions for positioning a working member of a rig, wherein the instructions, when executed by a computing system, cause the computing system to:

determine, based at least in part upon a first information captured by a first sensor, a first location of the working member using a map of a surface retrieved from memory;

indicate, via a display screen of the rig, the first location of the working member relative to the map of the surface;

register a design retrieved from memory to the map of the surface, to identify a path for the working member;

compare the first location of the working member with the path to determine a second location for the working member corresponding to the path for the working member; and control, responsive to the second location, at least one motor to move a stage, for receiving and holding the working member, to position the working member at the second location to align the working member with the path; and control the at least one motor to maintain alignment of the working member with the path by moving the working member in a first direction as the rig is advanced in a second, different direction.

35. The computer readable media of claim 34, wherein the instructions, when executed, cause the computing system to:

capture, by a second sensor, second information of the surface of the material, the second information comprising a plurality of images; and use the plurality of images of the second information to build the map of the surface of the material.

36. The computer readable media of claim 35, wherein the first sensor and the second sensor are the same sensor.

37. The computer readable media of claim 34, wherein the instructions, when executed, cause the computing system to:

analyze the first information including information corresponding to one or more markers on the surface of the material to determine the first location of the working member using the map.

38. The computer readable media of claim 34, wherein the instructions, when executed, cause the computing system to:

provide motor control information to control the at least one motor to move the stage to position the working member at a plurality of locations subsequent to the second location while the rig is advanced in a corresponding plurality of subsequent directions.

39. The computer readable media of claim 35, wherein the instructions, when executed, cause the computing system to build the map of the surface by stitching the plurality of images together.

40. The computer readable media of claim 35, wherein the map comprises image data.

41. The computer readable media of claim 35, wherein the first information indicates a first one or more markers, and the map indicates a second one or more markers,
  wherein the system determines the first location based at least in part upon matching information corresponding to the first one or more markers from the first information to information corresponding to the second one or more markers from the map.

42. The computer readable media of claim 41, wherein the information corresponding to one or more markers from the map comprises information corresponding to one or more markers from each of two or more images from the plurality of images.

* * * * *